United States Patent [19]
Hagersten et al.

[11] Patent Number: 5,926,829
[45] Date of Patent: *Jul. 20, 1999

[54] HYBRID NUMA COMA CACHING SYSTEM AND METHODS FOR SELECTING BETWEEN THE CACHING MODES

[75] Inventors: Erik Hagersten, Palo Alto, Calif.; Robert C. Zak, Jr., Lexington, Mass.

[73] Assignee: Sun Microsystems, Inc., Mountain View, Calif.

[ * ] Notice: This patent is subject to a terminal disclaimer.

[21] Appl. No.: 09/005,058

[22] Filed: Jan. 9, 1998

[63] Continuation of application No. 08/577,283, Dec. 22, 1995., Pat. No. 5,710,907

[51] Int. Cl.$^6$ .................................................. G06F 13/14
[52] U.S. Cl. ................................ 711/120; 711/148
[58] Field of Search .................................. 711/119, 120, 711/121, 130, 147, 148

[56] References Cited

U.S. PATENT DOCUMENTS 5,710,907  1/1998  Hagersten et al. ..................... 711/148

OTHER PUBLICATIONS

Kal Li, et al., *Memory Coherence in Shared Virtual Memory Systems*, Department of Computer Science, Yale University, pp. 229–239.

Ashley Saulsbury, et al., *An Argument for Simple COMA*, Swedish Institute of Computer Science.

D. Lenosky, PhD, *The Design and Analysis at Dash: A Scalable Directory=Based Multiprocessor*, PhD Thesis, Dec. 1991, pp. 36–56.

Erik Hagersten, et al., *Simple Coma Node Implementations*, Sun Microsystems Computer Corp.

Erik Hagersten, et al., *Simple COMA*, Swedish Institute of Computer Science, Jul. 1993, pp. 233–259.

Joe, T. et al., *Evaluating the Memory Overhead Required for COMA Architectures*, Proceedings of the Annual International Symposium on Computer Architecture, Chicago, Apr. 18–24, 1994 No. Symp 21 IEEE pp. 82–93.

Stenstrom, P. et al., Comparative Performance Evaluation of Cache–Coherent NUMA and COMA Architectures, Computer Architecture News, vol. 20, No. 2, May 1, 1992, pp. 80–91.

LaRowe, Jr., R.P. et al, *The Robustness of NUMA Memory Management*, Proceedings of the Symposium on Operating Systems Principles, Pacific Grove, Oct. 13–16, 1991, No. Symp. 13, Oct. 13, 1991, Association for Computing Machinery, pp. 137–151.

Reinhardt, S.K. et al., Tempest and Typhoon: User–Level Shared Memory, Computer Architecture News, vol. 22, No. 2, Apr. 1, 1994, pp. 325–336.

Krishnamoorthy et al., A Scaleable Distributed Shared Memory Architecture, Journal of Parallel and Distributed Computing, vol. 22, No. 3, pp. 547–554, Sep. 1994.

*Primary Examiner*—David L. Robertson
*Attorney, Agent, or Firm*—Conley, Rose & Tayon, PC; B. Noel Kivlin

[57] ABSTRACT

The present invention provides a hybrid Non-Uniform Memory Architecture (NUMA) and Cache-Only Memory Architecture (COMA) caching architecture together with a cache-coherent protocol for a computer system having a plurality of sub-systems coupled to each other via a system interconnect. In one implementation, each sub-system includes at least one processor, a page-oriented COMA cache and a line-oriented hybrid NUMA/COMA cache. Such a hybrid system provides flexibility and efficiency in caching both large and small, and/or sparse and packed data structures. Each sub-system is able to independently store data in COMA mode or in NUMA mode. When caching in COMA mode, a sub-system allocates a page of memory space and then stores the data within the allocated page in its COMA cache. Depending on the implementation, while caching in COMA mode, the sub-system may also store the same data in its hybrid cache for faster access. Conversely, when caching in NUMA mode, the sub-system stores the data, typically a line of data, in its hybrid cache.

20 Claims, 17 Drawing Sheets

HYBRID NUMA COMA CACHING SYSTEM AND METHODS FOR SELECTING BETWEEN THE CACHING MODES

This is a Continuation of application Ser. No. 08/577,283 filed on Dec. 22, 1995, now U.S. Pat. No. 5,710,907.

BACKGROUND OF THE INVENTION

1. Field of the Invention

The present invention relates to the field of caches. More particularly, the invention relates to hybrid caching architectures and protocols for multi-processor computer systems.

2. Description of the Related Art

Multi-processor multi-cache computer systems with cache-coherent memories can be based on several cache architectures such as Non-Uniform Memory Architecture (NUMA) and Cache-Only Memory Architecture (COMA). In both examples, cache-coherence protocols are also needed if coherency is to be maintained between the respective caches.

FIGS. 1A, 1B, and 1C–1D are a block diagram, an address map and two flowcharts, respectively, illustrating a cache-coherent NUMA (CC-NUMA) computer system 100. As shown in FIG. 1A, CC-NUMA system 100 includes a plurality of sub-systems 110, 120, . . . 180 coupled to each other by a global interconnect 190. Each sub-system includes at least one processor, a corresponding memory management unit (MMU), a corresponding second level cache (L2$), a main memory, a global interface, a directory and a local interconnect. For example, sub-system 110 includes processors 111a, 111b, . . . 111i, MMUs 112a, 112b, . . . 112i, L2$s 113a, 113b, . . . 113i, main memory 114, global interface 115, directory 116 and local interconnect 119. Note that since sub-systems 110, 120, . . . 180 are similar in structure, the following description of sub-system 110 is also applicable to sub-systems 120, . . . 180.

Processors 111a, 111b, . . . 111i are coupled to MMUs 112a, 112b, . . . 112i, respectively. In turn, MMUs 112a, 112b, . . . 112i are coupled to L2$s 113a, 113b, . . . 113i respectively. L2$s 113a, 113b, . . . 113i, main memory 114 and global interface 115 are coupled to each other via local interconnect 119. Directory 116 is coupled to global interface 115.

Referring now to the memory map of FIG. 1B, the total physical address space of CC-NUMA computer system 100 is distributed among main memories 114, 124, . . . 184. Thus, partitioning of the (global) addressable space (GA) is static and is determined before system configuration time, i.e., before the execution of application software. Accordingly, the first time a sub-system 110 needs to read or write to an address location outside its pre-assigned address space, the data has to be fetched from one of sub-systems 120, . . . 180.

In this example, global interface 115 is responsible for tracking the status of data associated with the address space of main memory 114. The status information of each memory location is stored as a memory tag (MTAG) in directory 116. In addition, since global interface 115 is also responsible for maintaining global cache coherency, global interface 115 includes hardware and/or software implemented cache coherency mechanism for maintain coherency between the respective caches and main memories of sub-systems 110, 120, . . . 180.

A typical read request, e.g., a Read_To_Share (RTS), by processor 111a of sub-system 110 occurs in the following manner as illustrated by the flowcharts of FIGS. 1C and 1D. First, processor 111a presents a virtual address (VA) to MMU 112a which converts the VA into a global address (GA) and presents the GA to L2$ 113a (step 1110). If there is a valid copy of the data line of interest in L2$ 113a, e.g., a shared (S) or owned (O) copy, then L2$ 113a provides the data to processor 111a via MMU 112a, thereby completing the read request (steps 1120, 1125).

Conversely, if L2$ 113a does not have a valid copy, then L2$ 113a presents the GA to the local interconnect 119 of the requesting sub-system 110 (step 1130). If the GA is not part of the requesting sub-system 110's local address space, i.e., the requesting sub-system is not the home sub-system, then the request is forwarded to the appropriate home sub-system, e.g., sub-system 120 (step 1145).

Referring now to FIG. 1D, in the above cases where the data cannot be found in the L2$ of the requesting sub-system 110, the home directory (116 or 126) is updated to reflect this response, for example by marking requesting sub-system 110 as a sharer of the data (step 1148).

Next, if requesting sub-system 110 is also the home sub-system, the corresponding MTAG in directory 116 is checked for an appropriate MTAG state, e.g., modified (M), owned (O) or shared (S) for a read (step 1150). If the MTAG state is inappropriate for the read request, or if requesting sub-system 110 is not home sub-system, directory 126 is checked for an appropriate MTAG state. The directory of the home sub-system has information about which sub-system (s) have valid copies of the data line and which sub-system is the owner of the data line. Note also that home sub-system may or may not be the owner sub-system. Note further that if the requesting sub-system is also the home sub-system, then the MTAG states will provide an indication of whether the transaction is permitted, i.e., the home directory does not need to be involved in the particular transaction.

If the home sub-system (110 or 120) is determined to have a valid copy of the data line, then the home sub-system provides the data to requesting sub-system 110 (step 1162). In the case where requesting sub-system 110 is also the home sub-system, only an internal data transfer is required. Alternatively, where home sub-system 120 is not the requesting sub-system, then global interface 120 of home sub-system 120 responds by retrieving the data line from main memory 124 and sending the requested data line to global interface 115 of requesting sub-system 110 via global interconnect 190.

Conversely, if the home sub-system (110 or 120) does not have a valid copy of the data line, i.e., the home sub-system is not the owner sub-system, then the read request with the GA is forwarded to the global interface of the sub-system who is the owner of the data line of interest, e.g., global interface 185 of owner sub-system 180 (step 1155). Global interface 185 responds by retrieving the data line from one of the L2$s of owner sub-system 180, e.g., owner L2$ 183a, and sending the requested data line to global interface 115 of requesting sub-system 110 via global interconnect 190 (steps 1164).

Upon receiving the data line, global interface 115 forwards the data line to L2$ 113a which provides the data requesting processor 111a (step 1180). The data line can be cached in L2$ off the critical path for subsequent retrieval by processor 111a (1190).

When a location in an L2$, e.g., L2$ 113a, is needed for storing another data value, the old cache line needs to be replaced. In this implementation, cache lines having an S state are replaced "silently", i.e., they do not generate any new transactions in computer system 100. In other words, a sub-system remains marked in the home directory of the cache line as a sharer of the replaced cache line with respect to the rest of system 100. Conversely, replacement of cache lines having either O or M state will generate a WB transaction to the main memory of the sub-system responsible for this GA. As such, the directory associated with the responsible sub-system is updated to reflect this change.

In sum, the architecture of CC-NUMA system 100 is better-suited for executing software programs using small data structures which requires a small number of the available cache lines in L2$ 113a. This is because the small data structures can remain entirely in L2$ 113a while they may be repeatedly accessed. Unfortunately, CC-NUMA system 100 is unable to cache large data structures which are too large to be stored entirely in L2$ 113a, causing a thrashing problem whereby portions of large data structures are repeatedly cached and discarded.

FIGS. 2A, 2B, 2C, 2D and 2E illustrate a simple COMA (S-COMA) computer system 200 which is capable of caching large data structures in their entirety since S-COMA system 200 allocates its cache memory space a page at a time. As shown in the block diagram of FIG. 2A, S-COMA system 200 includes a plurality of sub-systems 210, 220, ... 280 coupled to each other by a global interconnect 290. Each sub-system includes at least one processor, a corresponding memory management unit (MMU), a corresponding second level cache (L2$), a cache memory, a global interface, an address translator, a directory and a local interconnect For example, sub-system 210 includes processors 211a, 211b, ... 211i, MMUs 212a, 212b, ... 212i, L2$s 213a, 213b, ... 213i, cache memory 214, global interface 215, directory 216, address translator 217 and local interconnect 219. Note that since sub-systems 210,220, ... 280 are similar in structure, the following description of sub-system 210 is also applicable to sub-systems 220, ... 280.

Processors 211a, 211b, ... 211i are coupled to MMUs 212a, 212b, ... 212i, respectively. In turn, MMUs 212a, 212b, ... 212i are coupled to L2$s 213a, 213b, ... 213i respectively. L2$s 213a, 213b, ... 213i, main memory 214 and global interface 215 are coupled to each other via local interconnect 219. Directory 216 is coupled to global interface 215. Address translator 217 is located between global interface 215 and global interconnect 290.

Referring now to the memory maps of FIGS. 2B and 2C, responsibility for tracking the status of total addressable space of S-COMA system 200 is distributed among the respective home directories of sub-systems 210, 220, . . . 280. Partitioning of the cache memories of S-COMA computer system 200 is dynamic, i.e., cache memories 214, 224, . . . 284 function as attraction memory (AM) wherein cache memory space is allocated in page-sized portions during execution of software as the need arises. Note that cache lines within each (allocated) page are individually accessible.

Hence, by allocating memory space in entire pages in cache memories 214, 224, . . . 284, S-COMA computer system 200 avoids the above-described capacity and associativity problem associated with caching large data structures. By simply replacing main memories 114, 124, ... 184 with similarly-sized page-oriented cache memories 214, 224, . . . 284, large data structures can now be cached entirely in sub-system 210.

In this example, global interface 215 is responsible for tracking the status of data stored in cache memory 214 of sub-system 210, with the status information stored as memory tags (MTAGs) in a corresponding location within directory 216. In addition, since global interface 215 is also responsible for maintaining global cache coherency, global interface 215 includes hardware and/or software implemented cache coherence mechanism for maintaining coherency between cache 214 of sub-system 210 and the caches of other sub-systems 220, . . . 280. Address translator 217 is responsible for translating local physical addresses (LPAs) into global addresses (GAs) for outbound data accesses and GAs to LPAs for incoming data accesses.

In this implementation, the first time a sub-system, e.g., sub-system 210, accesses a particular page, address translator 217 is unable to provide a valid translation from VA to PA for sub-system 210, resulting in a software trap. A trap handler of sub-system 210 selects an unused page in cache memory 214 to hold data lines of the page. MTAGs of directory 216 associated with the page are initialized to an "invalid" state, and address translator 217 is also initialized to provide translations to/from this page's local physical address (LPA) from/to the unique global address (GA) which is used to refer to this page throughout system 200.

A typical read request, e.g., a read-to-share (RTS) request, by processor 211a of sub-system 210 occurs in the following manner as illustrated by the flowcharts of FIGS. 2D and 2E. First, processor 211a presents a virtual address (VA) to MMU 212a which converts the VA into a LPA and presents the LPA to L2$ 213a (step 2110). If there is a valid copy of the data line of interest in L2$ 213a, e.g., a shared (S), owned (O) or modified (M) copy, then L2$ 213a provides the data to processor 211a, and the read request is completed (steps 2120, 2125).

Conversely, if L2$ 213a does not have a valid copy, then L2$ 213a presents the LPA to global interface 215 (step 2130). Global interface 215 accesses MTAGs of directory 216 to determine if a valid copy of the data line can be found in cache memory 214 (step 2132).

If such a valid copy exist, the data line is retrieved from cache memory 214 (step 2134). The data line is then provided to L2$ 213a which provides the data to processor 211a via MMU 212a, thereby completing the read request (step 2136).

However, if a valid copy of the data line of interest cannot be located in either L2$ 213a or cache memory 214, then requesting address translator 217 converts the LPA to a GA, before sending the data request via global interconnect 290 to the home sub-system whose address space includes the GA of the data line of interest, e.g., sub-system 220 (step 2142). Next, address translator 227 of home sub-system 220 converts the GA into a LPA (step 2144), and looks up the appropriate directory entry to determine if there is a valid copy of the data line in home cache memory 224 (step 2150). This GA to LPA translation in home sub-system 220 can be a trivial function such as stripping an appropriate number of most significant bits (MSBs).

Referring now to FIG. 2E, in each of the above cases where the data line is not found in requesting sub-system 210, home sub-system 220 updates home directory 226, e.g., to reflect a new sharer of the data line (step 2148).

If a valid copy exist in home sub-system 220, global interface 225 responds by retrieving the data line from cache memory 224 or L2$ 223a, before sending the requested data line to global interface 215 of requesting sub-system 210 via global interconnect 290 (step 2162).

Conversely, if home sub-system 220 does not have a valid copy of the data line, then the read request with the GA is forwarded to the address translator of the owner sub-system, e.g., translator 287 (step 2152). Upon receiving the GA from home sub-system 220, address translator 287 of sub-system 280 converts the GA into an LPA for global interface 285 (step 2154). This GA to LPA translation in owner sub-system 280 is a non-trivial function. Next, global interface 285 of owner sub-system 280 responds by retrieving the data line from either cache memory 284 or one of 2L$s 283a, 283b, . . . 283i, and sending the requested data line to global interface 215 of requesting sub-system 210 via global interconnect 290 (step 2164).

When the data line arrives at global interface 215, global interface 215 forwards the data line to L2$ 213a which then provides the data to requesting processor 211a (step 2180). The data line can be cached in L2$ 213a off the critical path for subsequent retrieval by processor 211a thereby completing the read transaction (2190). Note that a GA to LPA translation is not required for returning data.

Occasionally, replacement of (entire) pages stored in cache memory 214 may be needed when cache memory 214 becomes full or is nearly full, in order to make room for allocating new page(s) on a read request. Ideally, sub-system 210 maintains an optimal amount of free pages in cache memory 214 as a background task, i.e., off the critical timing path, ensuring that the attraction memory, i.e., cache memory 214, does not run out of storage space. Upon replacement, a determination of which cache lines of the to-be-replaced page contains valid data (either M, O or S state) is made by accessing the MTAGs stored in directory 216. A message is then sent to the responsible home directory informing the home directory that the cache line is to be replaced.

If the cache line has an M or O state, this transaction is similar to an owner sub-system's Write_Back (WB) transaction in CC-NUMA mode, which writes the data value to the home cache memory of home sub-system. If the cache line has an S state, the replacement transaction does not transfer any data, but updates the corresponding directory to reflect the fact that the to-be-replaced node, i.e., sub-system, no longer has a shared copy of the data line. Hence, in S-COMA system 200, replacement is not "silent" since the respective directory is continually updated to reflect any replacement(s) of the data line.

Although S-COMA system 200 is more efficient at caching larger data structures than CC-NUMA system 100, allocating entire pages of cache memory at a time in order to be able to accommodate large data structures is not a cost effective solution for all access patterns. This is because caching entire pages to accommodate large data structures is inefficient when the data structures are sparse or when only a few elements of the structure are actually accessed.

Hence there is a need to provide a hybrid caching architecture together with a cache-coherent protocol for a multiprocessor computer system that is flexible and efficient in caching both large and smaller, sparse and packed data structures.

Further, in order to fully exploit the capability of such a hybrid caching architecture, there is also the need for static and/or dynamic algorithms to efficiently select appropriate caching modes while executing programs with a wide variety of data structures and access patterns. Although specialized hardware event tracer for capturing class(es) of events, e.g., bus operations, over time, can be used to optimize caching mode selection, they are expensive and difficult to implement. This is because event ordering and timing capture based on in-circuit emulation (ICE) technology typically involve complicated high-speed analog circuitry and probes. Accordingly, any cache mode selection algorithm(s) should be simple and yet effective event-based histograms which captures some of the same event information, e.g., cache miss, to give some indication of the appropriateness of COMA versus NUMA cache optimization.

SUMMARY OF THE INVENTION

The present invention provides a hybrid Non-Uniform Memory Architecture (NUMA) and Cache-Only Memory Architecture (COMA) caching architecture together with a cache-coherent protocol for a computer system having a plurality of sub-systems coupled to each other via a system interconnect. In one implementation, each sub-system includes at least one processor, a page-allocating COMA cache and a line-allocating hybrid NUMA/COMA cache. Such a hybrid system provides flexibility and efficiency in caching both large and small, and/or sparse and packed data structures.

In accordance with the invention, each sub-system is able to independently store data in COMA mode or in NUMA mode. When caching in COMA mode, a sub-system allocates a page of memory space and then stores the data within the allocated page in its COMA cache. Depending on the implementation, while caching in COMA mode, the sub-system may also store the same data in its hybrid cache for faster access. Conversely, when caching in NUMA mode, the subsystem stores the data, typically a line of data, in its hybrid cache.

In one implementation, the memory address space is divided into a local physical address (LPA) space and a global address (GA) space for use in COMA and NUMA mode, respectively. Accordingly, the address of the data provides a quick indication as to whether the data had been cached previously in a particular mode.

When a processor of a requesting sub-system needs to access data, e.g., a read request, an attempt is made to retrieve the data from the hybrid cache of the requesting sub-system which supports both COMA and NUMA modes. If the data is not found in the hybrid cache of the requesting sub-system, and the address of the data indicates that memory space has been allocated for the data in COMA mode, then an attempt is made to retrieve the data from the COMA cache of the requesting sub-system. If the data is not found in either the hybrid or COMA cache of the requesting sub-system, then the request is forwarded to the home sub-system and the home directory is updated to reflect the new status of the requesting sub-system, e.g., as a new "sharer" of the data.

As discussed above, each sub-system can independently select an appropriate cache mode (e.g., per page) suitable for its pattern of access. Thus, when a read request is forwarded to the home sub-system, the data may be found in the COMA cache and/or the hybrid cache of the home sub-system. If the data is found in either caches, i.e., the home sub-system is also the owner subsystem, then the home sub-system provides the data to the requesting sub-system.

Conversely, if the data is not found in the home sub-system, then the request is forwarded to an owner sub-system identified by the home directory. Again, since the data may have been cached in the COMA cache and/or the hybrid cache of the owner sub-system, a search is made in both the COMA cache and the hybrid cache of the owner sub-system. If a valid copy of the data is found in the owner sub-system, the data is provided to the requesting sub-system.

Note that, although a read request sequence is illustrated in the example above, a write request sequence is similar, except that with a write request, the requesting sub-system is also responsible for ensuring that all cached copies of the data throughout the entire system is coherent, i.e., consistent.

In one embodiment, the default cache mode is COMA until the data access pattern of the software program executing in a particular sub-system provides an indication that caching in NUMA mode, i.e, caching in the hybrid cache only, is more efficient. Accordingly, each sub-system attempts to keep track of the instances where storing the data from a particular page of memory in COMA mode is not cost effective.

Two counters are employed per page in this implementation. A COMA_miss counter and a COMA_hit counter are assigned to each page of memory space. Each time data from a particular page cannot be found in the hybrid cache of a requesting sub-system but is found in the COMA cache of the requesting subsystem, the COMA_hit counter is incremented. Conversely, each time data from the same page is not found in either the hybrid cache or the COMA cache of the requesting sub-system, the COMA_miss counter is incremented.

Thus, the ratio of COMA_hit against COMA_miss counters provides the requesting sub-system with a good indication of the usefulness of caching a particular page in the local COMA cache, i.e., using the COMA caching mode for the particular page. For example, if the number of COMA_hit(s) far outweighs the number of COMA_miss(es), then the page should remain in the COMA cache of the requesting sub-system. Conversely, if the number of COMA_hit(s) are a lot lower than the number of COMA misses, then caching the particular page in the COMA cache of the requesting sub-system is not cost effective. Note that a low COMA_hit value indicates that the associated page is not accessed frequently, and hence replacing the page will have a small impact on the performance of the computer system.

DESCRIPTION OF THE DRAWINGS

The objects, features and advantages of the system of the present invention will be apparent from the following description in which.

NOTATIONS AND NOMENCLATURE

Figure 1A:
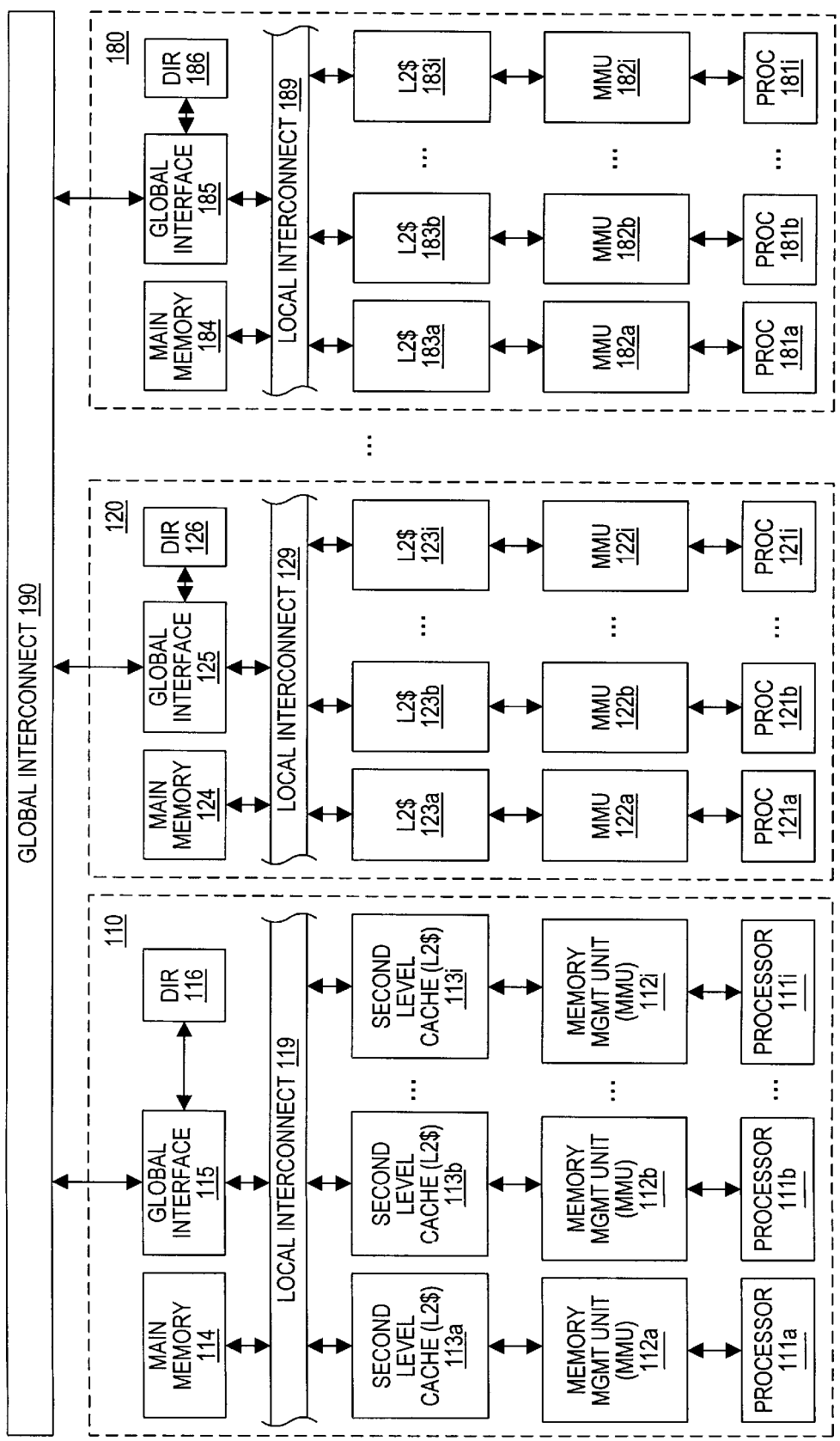
FIGS. 1A, 1B and 1C–1D are a block diagram, an address map and two flowcharts, respectively, illustrating a conventional cache-coherent non-uniform-memory-architecture (CC-NUMA) computer system.
Figure 1B:
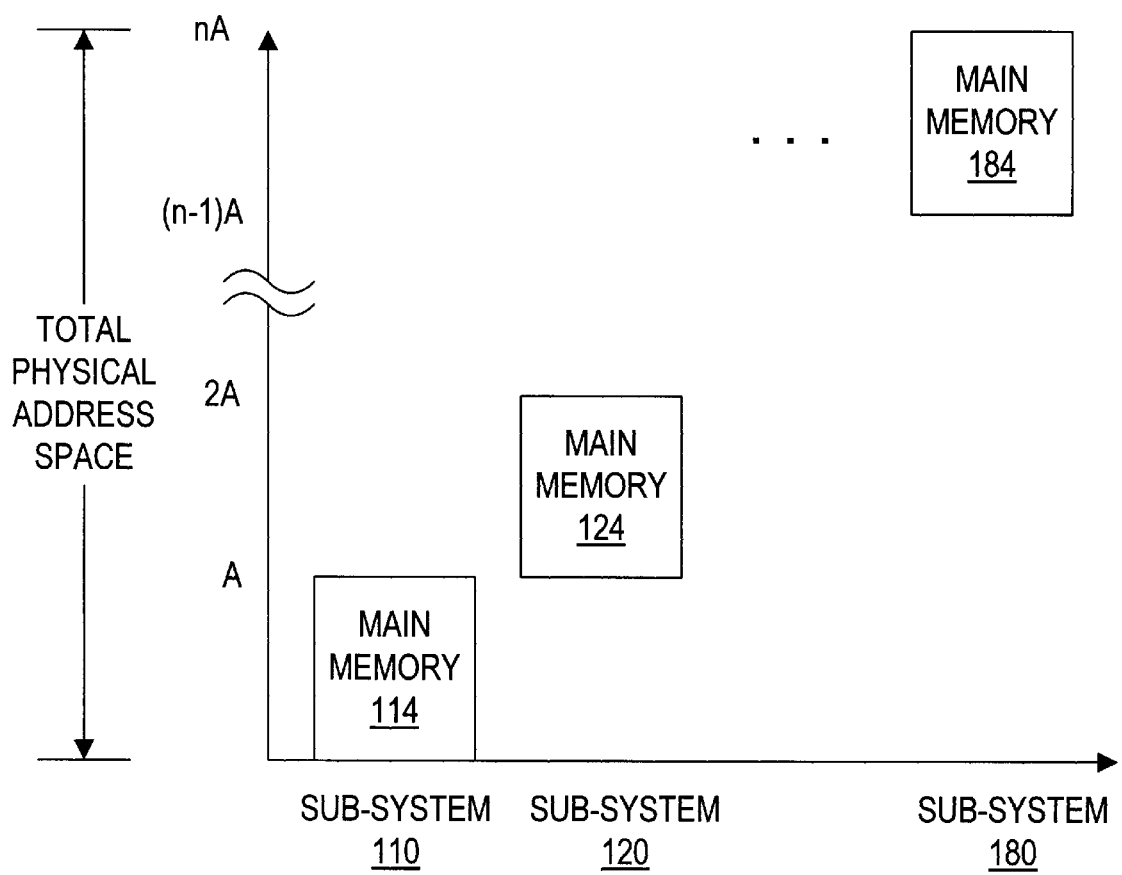
Figure 1C:
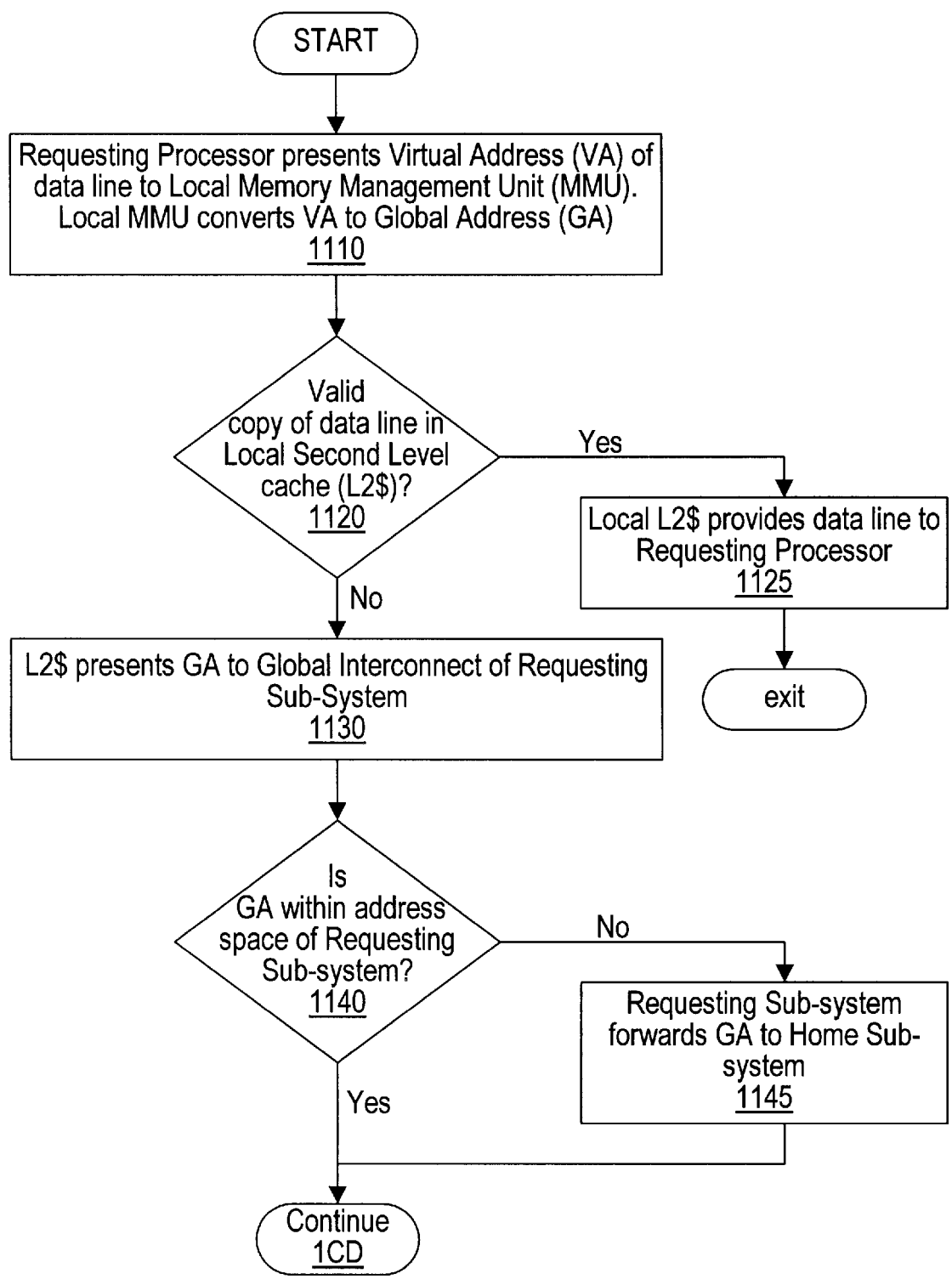
Figure 1D:
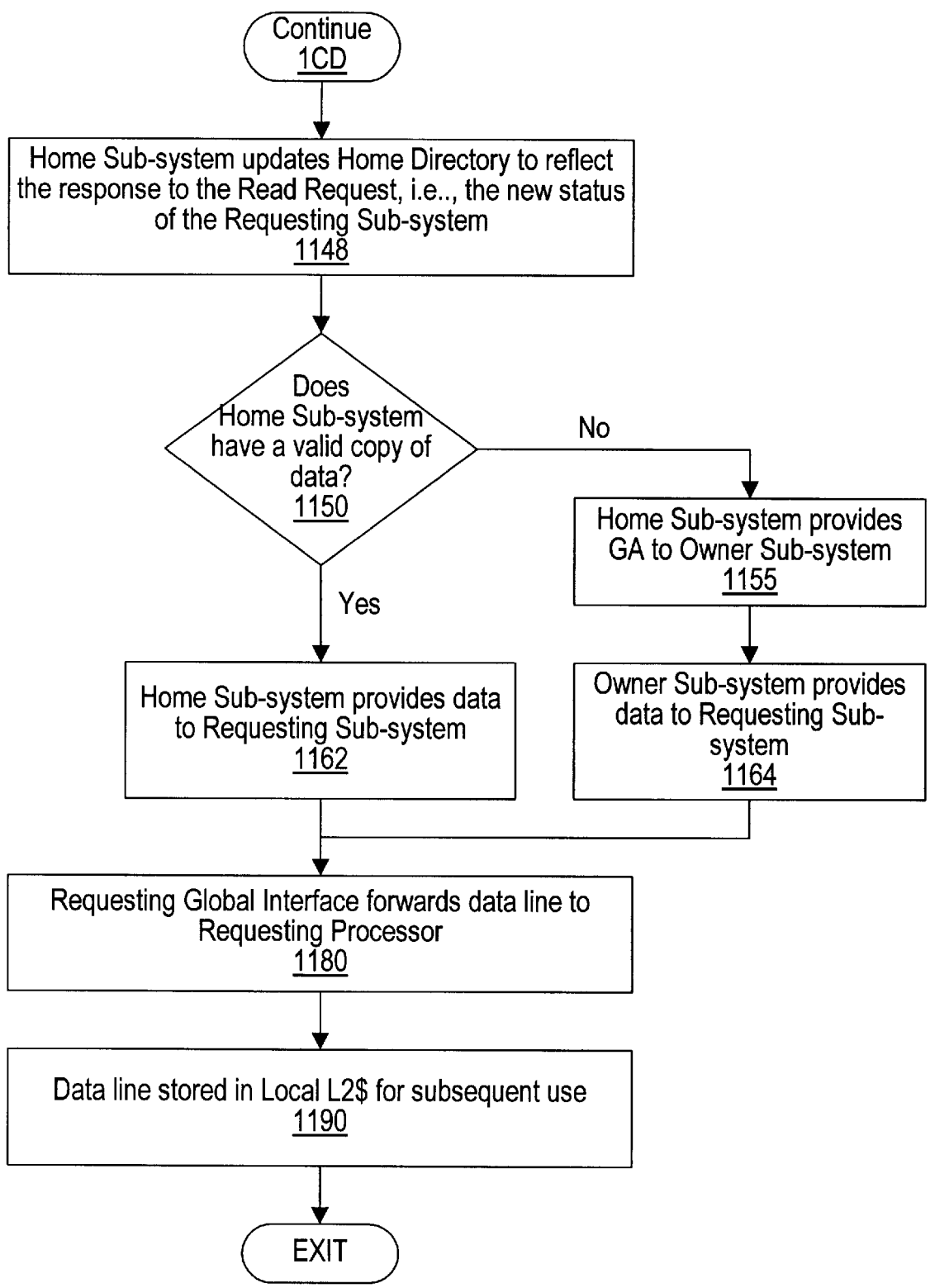
Figure 2A:
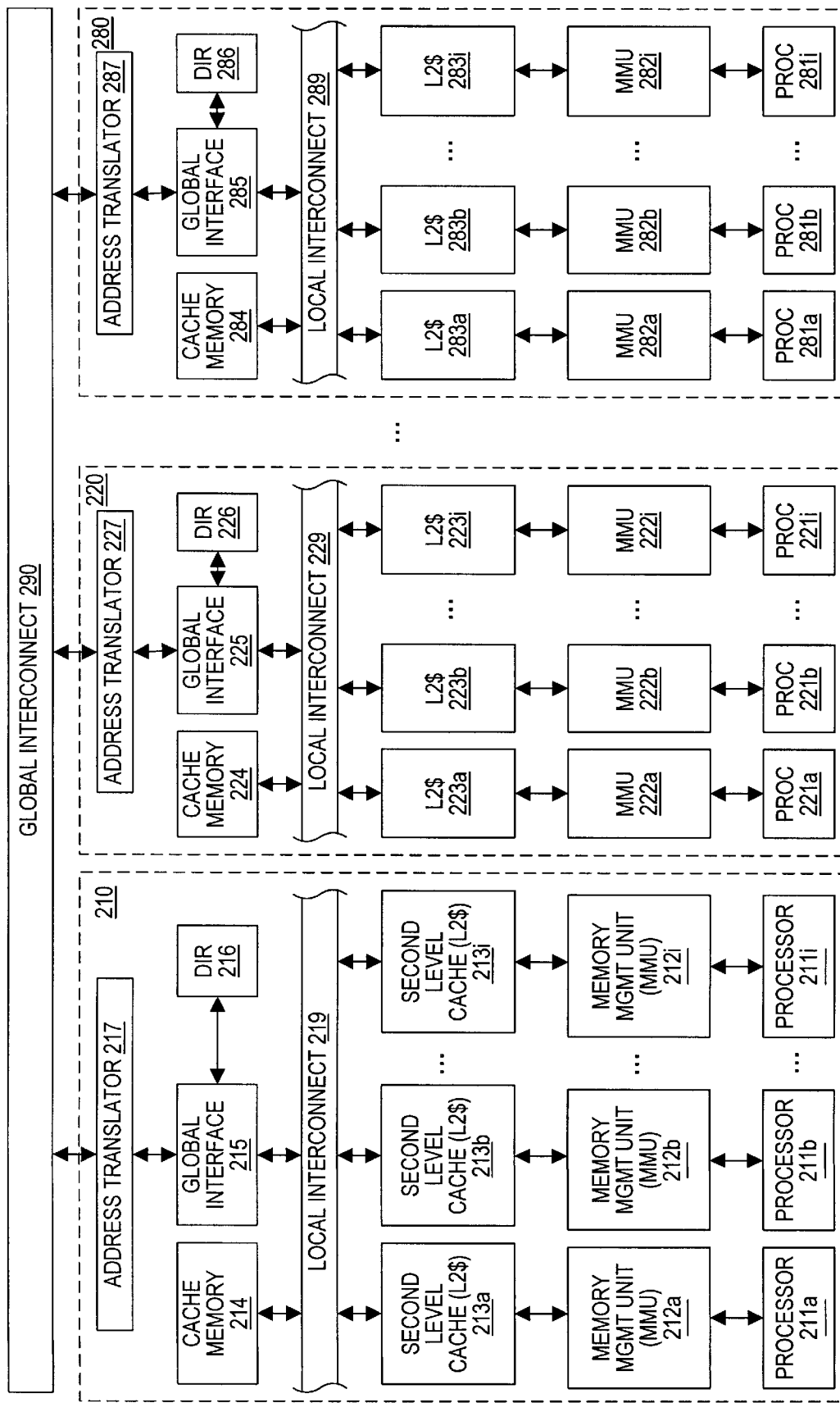
FIGS. 2A–2E illustrate a conventional simple cache-only-memory-architecture (S-COMA) computer system.
Figure 2B:
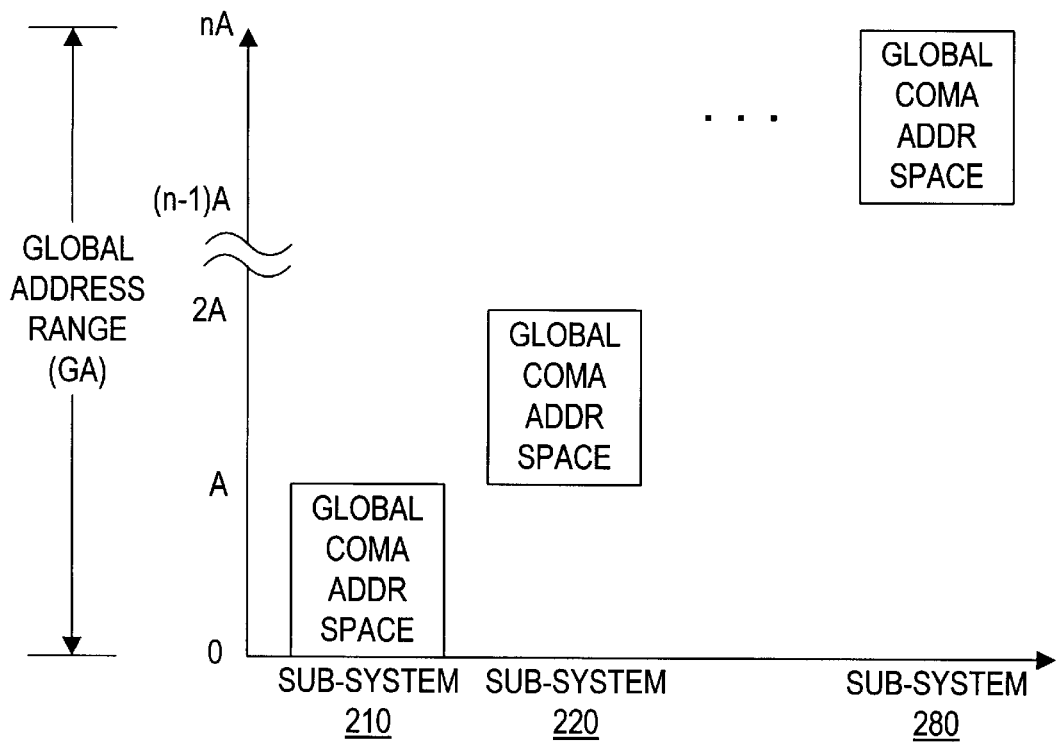
Figure 2C:
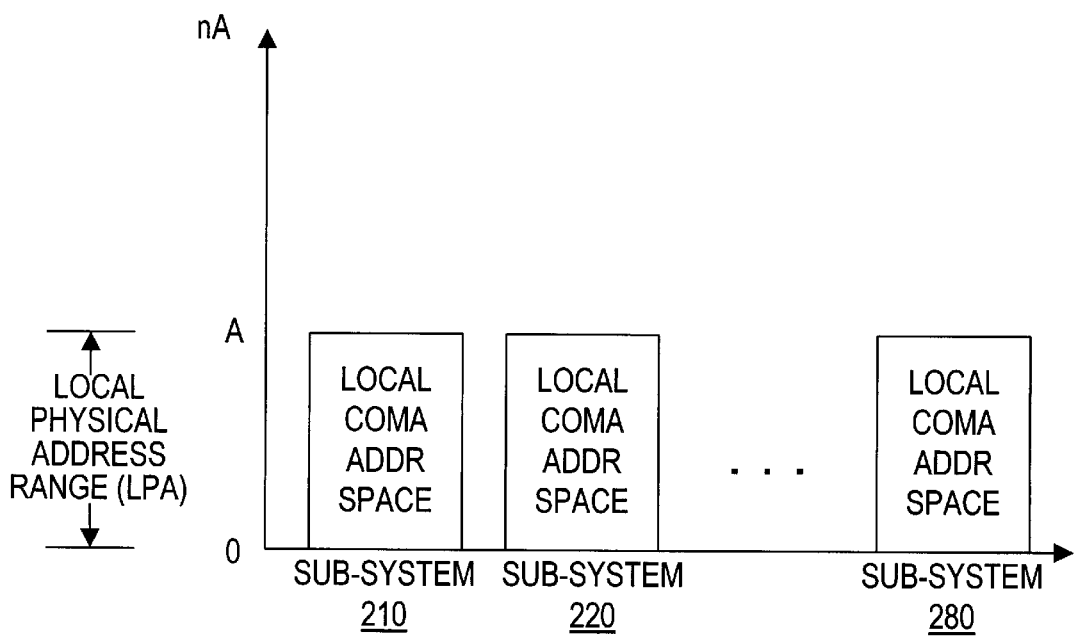
Figure 2D:
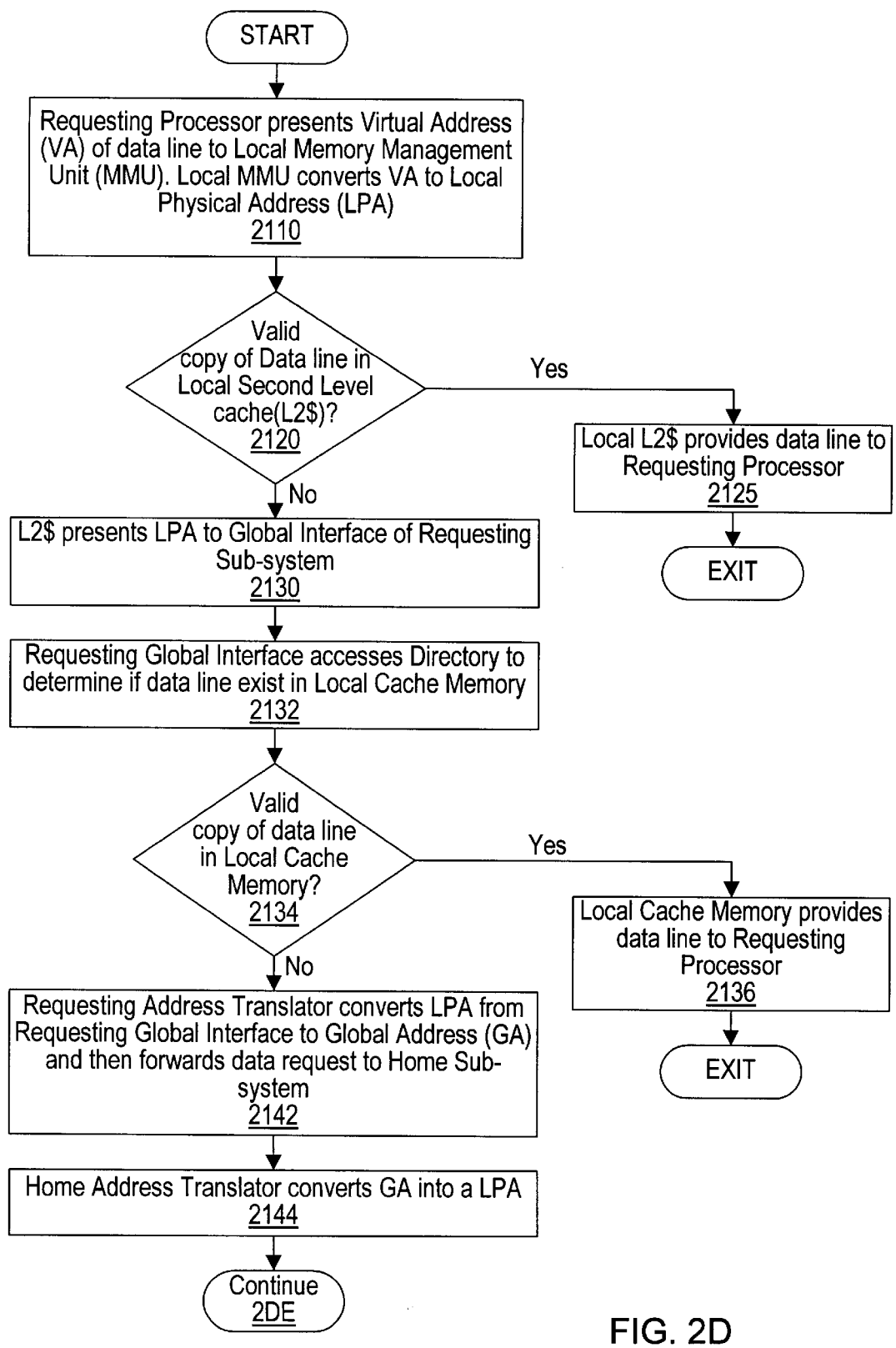
Figure 2E:
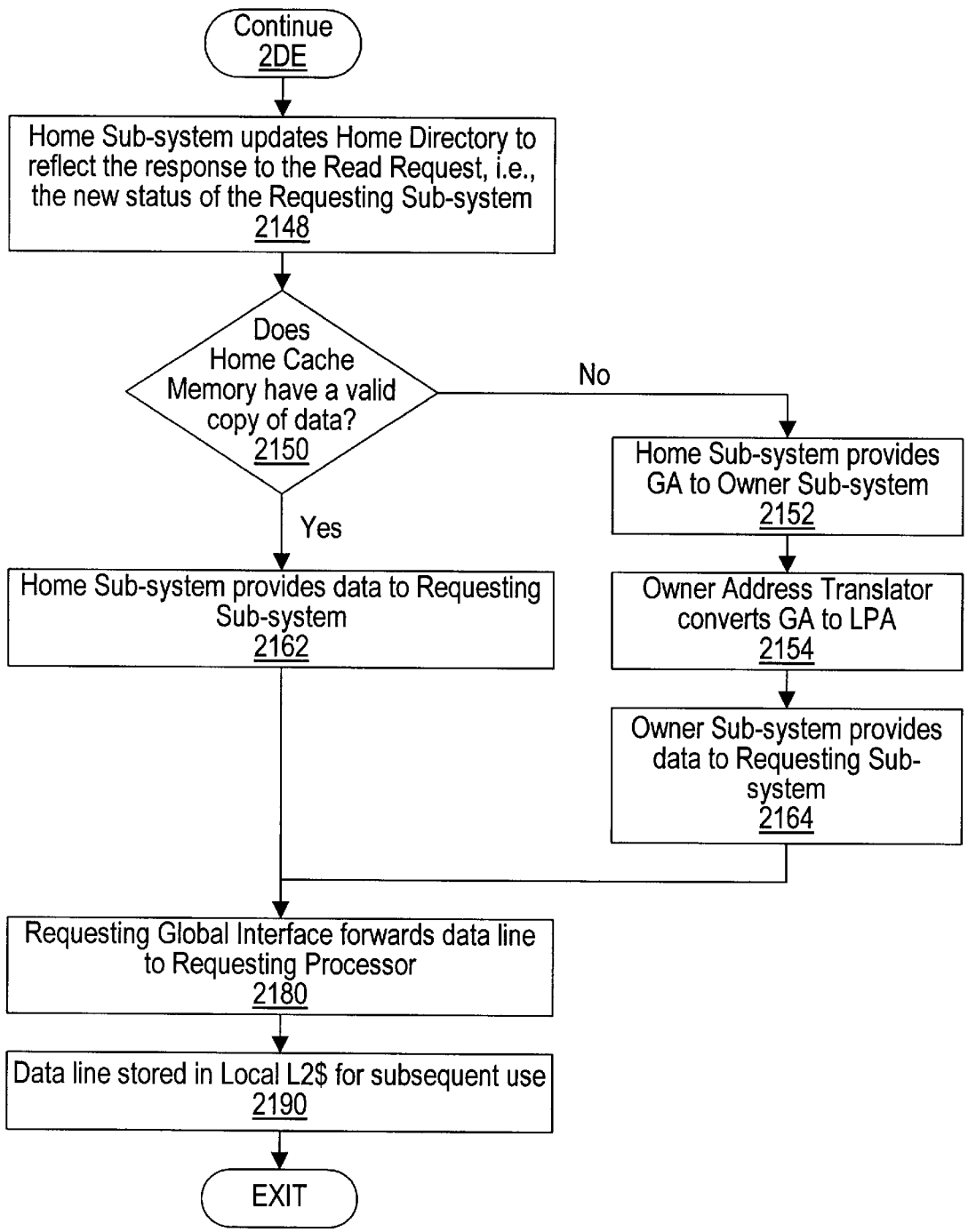

CLASSES OF CACHES MISSES i) Compulsory miss or Cold Start miss

Occurs the first time the data is accessed. Not affected by cache organization. Unavoidable without some other mechanism like "pre-fetching."

ii) Coherence miss

Occurs when data, previously in cache memory but later invalidated by a processor at another sub-system, is requested again, i.e., the previously valid copy is invalidated by a write request, e.g., a read-to-own (RTO) request, from another sub-system. Not affected by cache organization. Unavoidable in an invalidation-based coherence protocol.

iii) Capacity miss

Occurs when data, previously in cache memory but later replaced due to the limited cache memory size, is requested again, i.e., data had to be "bumped" (written-back) because cache ran out of space. This class of cache miss still occurs in a fully associative memory of the same size, but can be avoided in an infinitely large fully-associative cache.

iv) Conflict miss

Occurs when data, previously in cache memory but later replaced due to an access conflict to the same set, is requested again, i.e., old data had to be replaced because of the low level of associativity (i.e., not enough "ways"). This class of cache miss will not occur if the cache is fully associative, i.e., avoidable.

v) Combining miss

Occurs when a first processor of a sub-system has a local copy of the data but is unable to share the data with a second processor of the same sub-system sending a read-to-share (RTS) request, thereby causing the second processor to fetch the data from the owner sub-system. Avoidable.

CACHE LINE STATE

A "last-owner" state indicates that a node/sub-system was the previous owner of the data before it had to be written-back and replaced, i.e., bumped because of a capacity miss or a conflict miss.

DESCRIPTION OF THE PREFERRED EMBODIMENT

In the following description, numerous details provide a thorough understanding of the invention. These details include functional blocks and exemplary algorithms to assist a designer in implementing a hybrid Non-Uniform Memory Architecture (NUMA) and Cache-Only Memory Architecture (COMA) computer system. In addition, while the present invention is described with reference to a specific hybrid COMA/NUMA cache architecture and algorithms for exploiting the hybrid COMA/NUMA architecture, the invention is applicable to a wide range of computer systems. In other instances, well-known circuits and structures are not described in detail so as not to obscure the invention unnecessarily.

a) Architecture and Operation or a NUMA/COMA computer system

In accordance with the present invention, a hybrid COMA/NUMA cache architecture provides a cost-effective mechanism for efficiently executing a wide variety of software programs having large and/or small, and sparse and/or packed data structures. In addition, the hybrid COMA/NUMA architecture of the invention is able to efficiently execute software programs having code that are re-executed in large and/or small portions.

FIGS. 3A, 3B, 3C, 3D, 3E and 3F illustrate one embodiment of a COMA/NUMA hybrid computer system 300 of the present invention. Referring first to the block diagram of FIG. 3A, COMA system 300 includes a plurality of sub-systems 310, 320, . . . 380 coupled to each other by a global interconnect 390. Each sub-system includes one or more processors, corresponding memory management units (MMUs), corresponding hybrid second level cache (L2$s), a COMA cache memory, a global interface, an address translator, a directory table and a local interconnect. For example, sub-system 310 includes processors 311a, 311b, . . . 311i MMUs 312a, 312b, . . . 312i, hybrid L2$s 313a, 313b, ... 313i, COMA cache memory 314, global interface 315, directory 316, address translator 317 and local interconnect 319. Note that since sub-systems 310, 320, ... 380 are similar in structure, the following description of sub-system 310 is also applicable to sub-systems 320, ... 380.

Processors 311a, 311b, ... 311i are coupled to MMUs 312a, 312b, ... 312i, respectively. In turn, MMUs 312a, 312b, ... 312i are coupled to L2$s 313a, 313b, ... 313i, respectively. Hybrid L2$s 313a, 313b, ... 313i, main memory 314 and global interface 315 are coupled to each other via local interconnect 319. Directory 316 is coupled to global interface 315. In this embodiment, address translator 317 is located between global interface 315 and global interconnect 390.

Figure 3A:
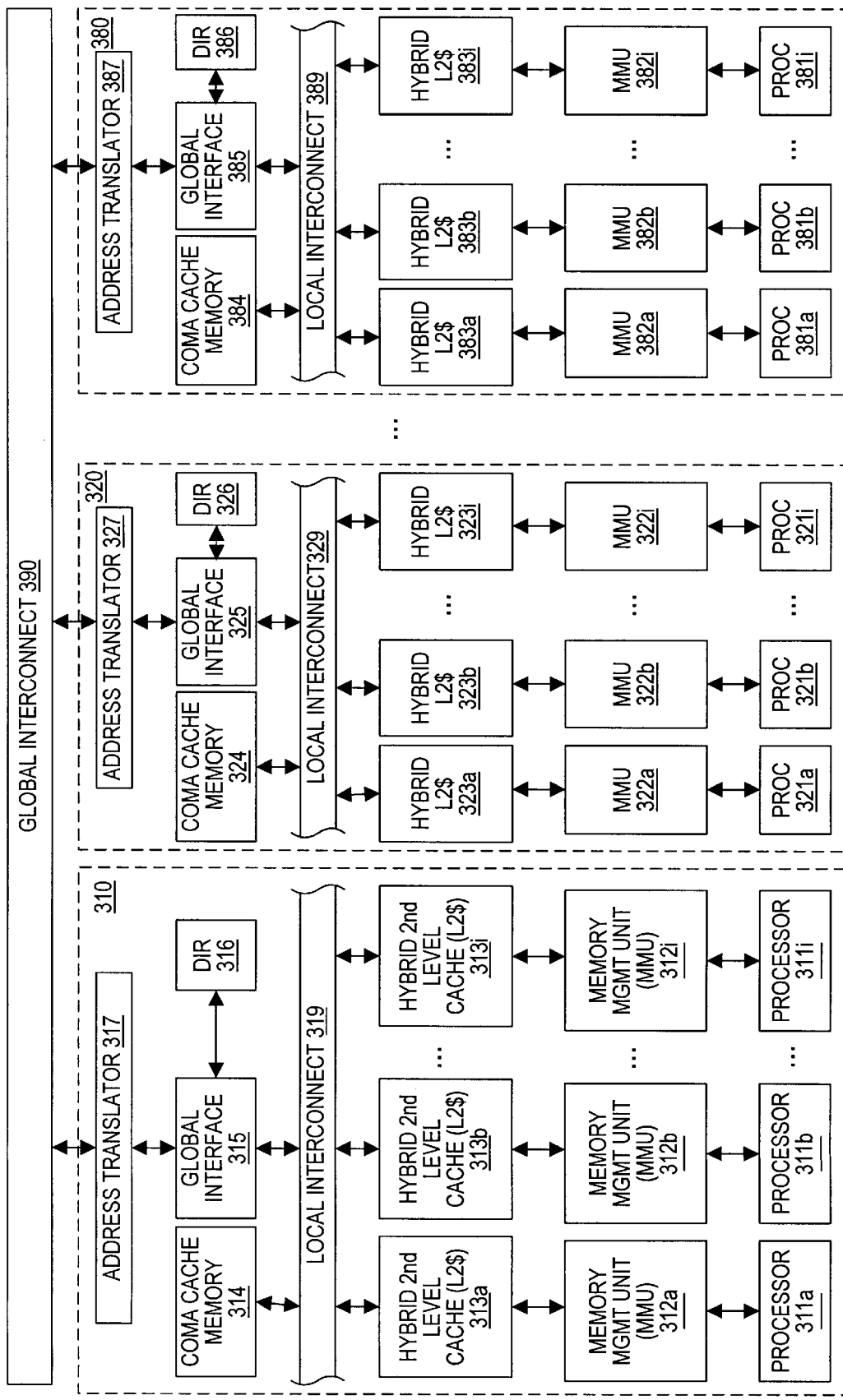
FIGS. 3A–3F illustrate one embodiment of the COMA/NUMA hybrid computer system of the present invention.
Figure 3B:
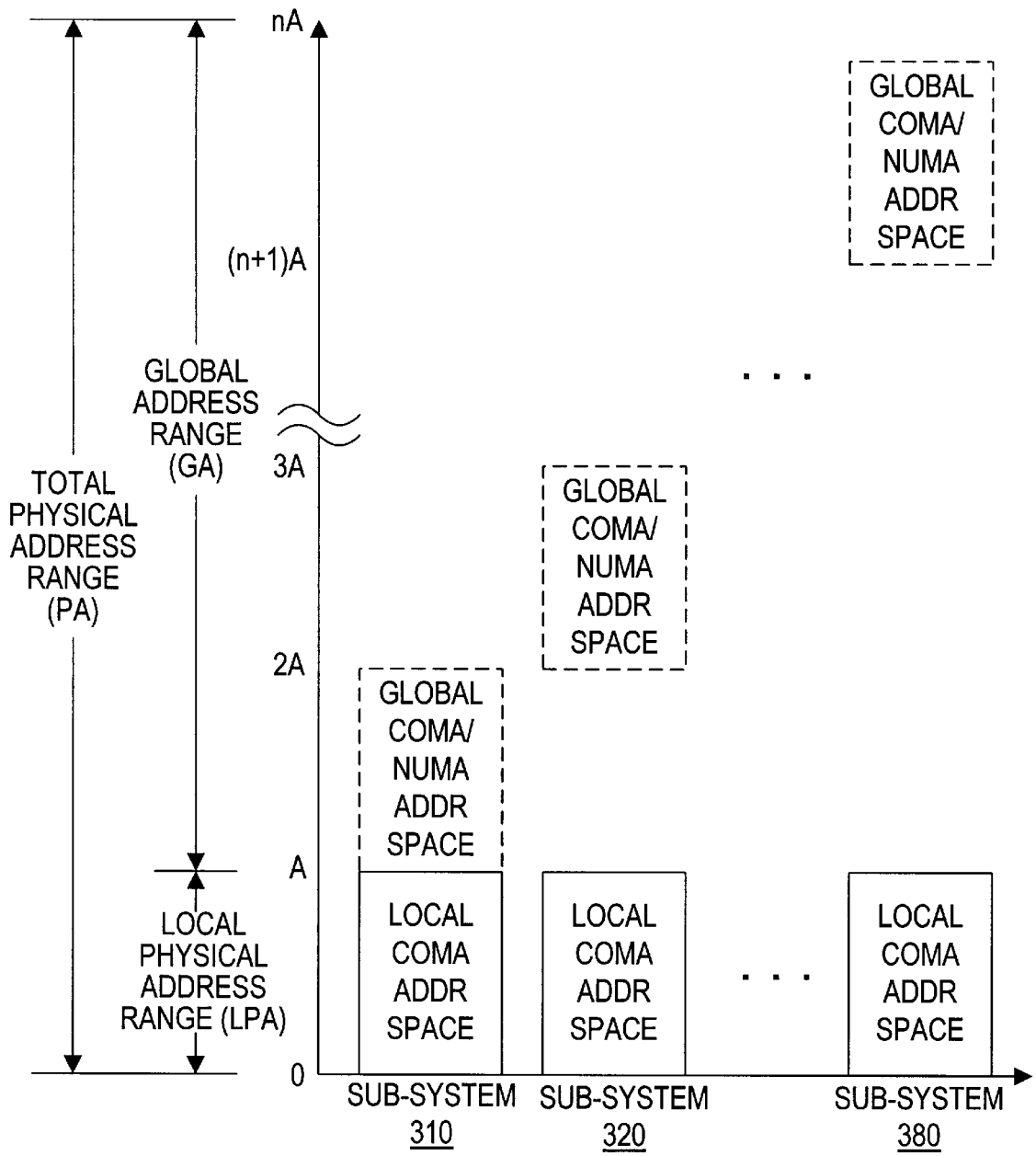

Referring now to the exemplary memory map of FIG. 3B, the total addressable physical address (PA) space is divided into a local physical address (LPA) space and a global address (GA) space, for use in COMA and NUMA modes, respectively. Addresses in the GA space may be generated either by the S-COMA address translation (in COMA mode) or directly by MMUs 312a, 312b, ... 312i (in NUMA mode). Note that COMA cache memory 314 supports COMA mode data accesses while L2$s 313a, 313b, ... 313i support both NUMA and COMA mode data accesses. Alternative implementation of the division between LPA and GA address spaces are possible. For example, an LPA may be the pre-assigned address space associated with a particular sub-system. Several exemplary algorithms for selecting between COMA and NUMA modes are described in detail below.

Responsibility for tracking the status of both NUMA and COMA address spaces is distributed among the respective home directories 316, 326, ... 386 associated with and coupled to global interfaces 315, 325, ... 385 of sub-systems 310, 320, ... 380, respectively. Accordingly, the first time sub-system 310 first accesses an address location outside its pre-assigned address space resulting in a compulsory miss, the data has to be fetched from one of the other sub-systems 320, ... 380.

Partitioning of COMA cache memories of computer system 300 is dynamic, i.e., COMA cache memories 314, 324, ... 384 function as attraction memory (AM) wherein cache memory space is allocated in page-sized portions during execution of software as the need arises. Note that although memory in COMA cache is allocated in page-sized portions, cache lines within each page are individually accessible.

In addition, since global interface 315 is also responsible for maintaining global cache coherency, global interface 315 includes a hardware and/or software implemented cache coherence protocol for maintain coherency between the cache of sub-system 310 and the caches of other sub-systems 320, ... 380.

Figure 3C:
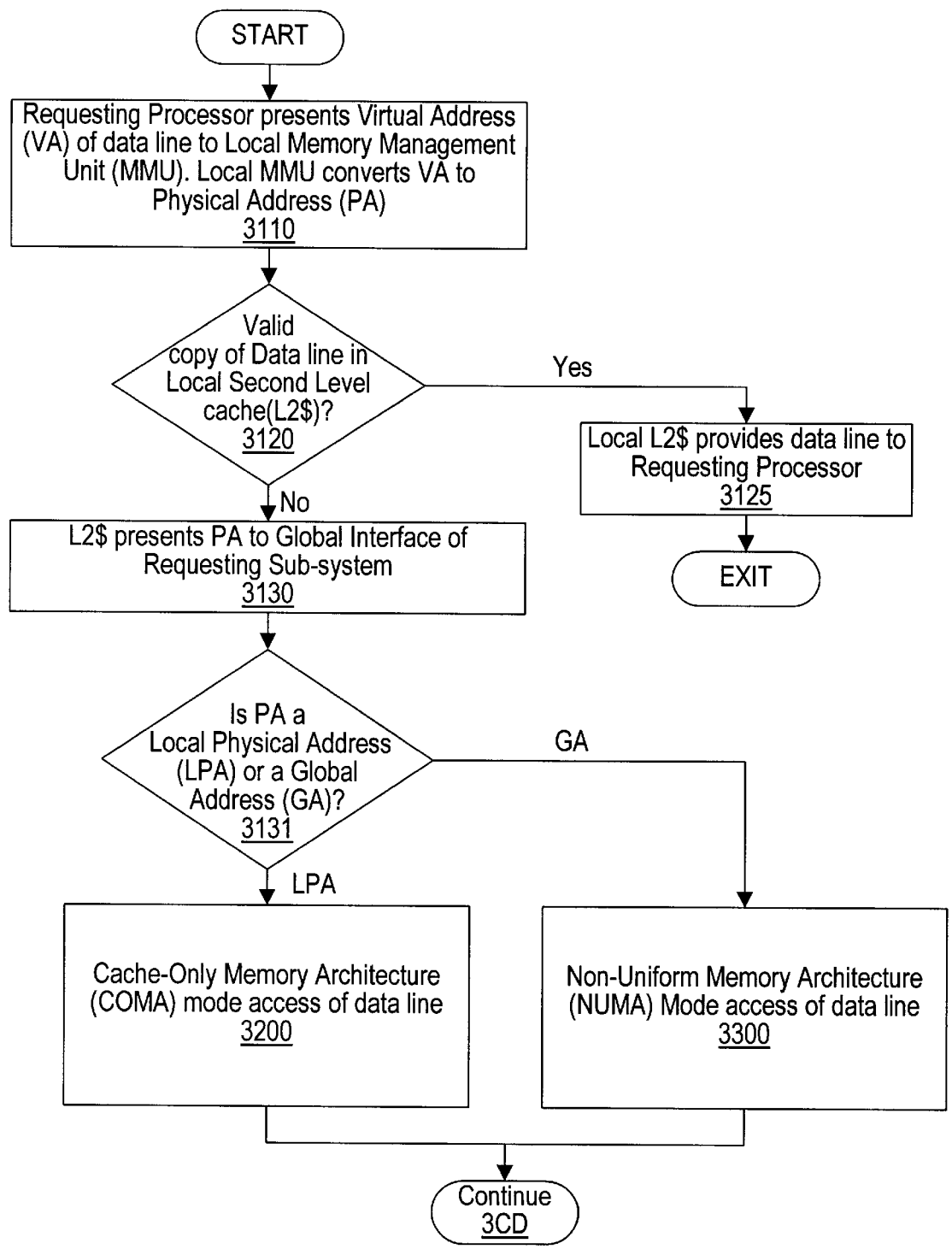
Figure 3D:
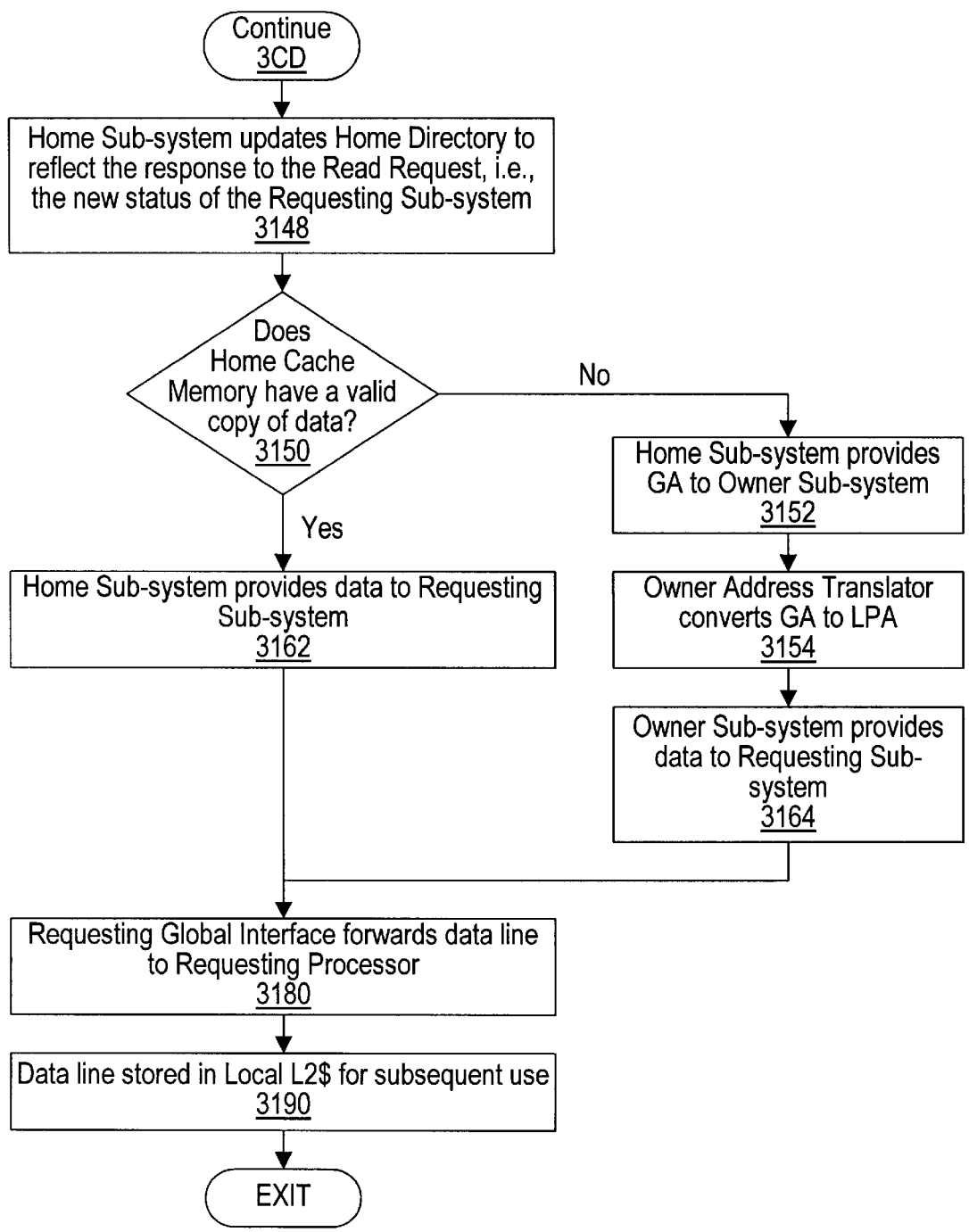

FIGS. 3C, 3D, 3E and 3F are flowcharts illustrating an exemplary read request, e.g., a Read_To_Share (RTS), by processor 311a of one embodiment of the present invention. Referring first to FIGS. 3C and 3D, processor 311a presents a virtual address (VA) to MMU 312a which converts the VA into a physical address (PA), for example by referencing a VA2PA table (step 3110). If there is a valid copy of the data line of interest in L2$ 313a, e.g., a shared (S) or owned (O) copy, then L2$ 313a provides the data to processor 311a, and the read access is completed (steps 3120, 3125). As discussed above, the data line may be successfully retrieved from L2$ 313a regardless of whether the data line was previously cached in COMA or NUMA mode.

Conversely, if the data line is not in L2$ 313a, since the PA provides an indication of whether the data line of interest may have been cached in COMA mode or NUMA mode, MMU 312a presents the PA to global interface 315 (step 3130). Accordingly, by simply comparing the PA against the local physical address (LPA) and global address (GA) ranges, L2$ 313a or global interface 315 can easily determine if further access should be attempted in COMA mode or NUMA mode (step 3131).

If the PA is within the LPA range, then a COMA mode access of the data line is attempted (step 3200). Alternatively, if the PA is within the GA range, then a NUMA mode access of the data line is attempted (step 3300). Note that a NUMA mode access may initiate a global read request transaction without the need to perform a lookup of MTAG state in the requesting directory 316 or the need to perform a LPA to GA translation in requesting translator 317, thereby reducing remote (inter sub-system) access latency and also reduce the overall utilization of hardware resources of system 300.

Figure 3E:
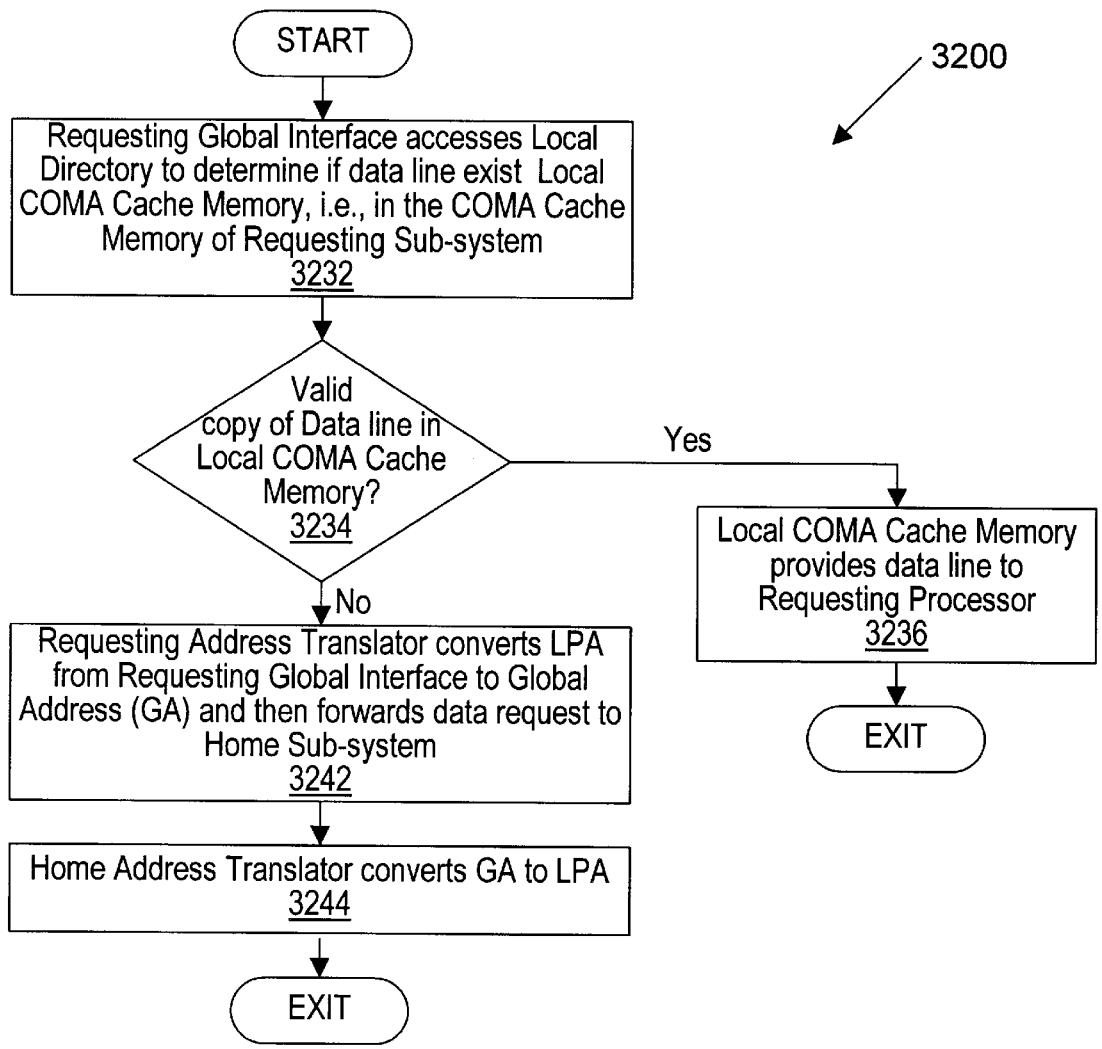

Referring now to FIG. 3E, in the case of the COMA mode access, the requesting global interface 315 accesses its MTAG in local directory 316 to determine if a valid copy of the data line can be found in COMA cache memory 314 (step 3232). If a valid copy of the data line is located in COMA cache memory 314 (step 3234), then the data is provided to processor 311a, and the read request is completed (step 3236).

However, if a valid copy of the data line cannot be found in COMA cache memory 314, then global interface 315 presents the LPA to address translator 317 where the LPA is translated into a GA before being sent to the home sub-system whose address space includes the data line of interest, e.g., sub-system 320, via global interconnect 390 (step 3242). Upon receiving the GA from sub-system 310, address translator 327 of home sub-system 320 converts the GA into a recognizable LPA, for example by simply dropping the most significant bit(s) since the read request already includes the necessary portion of the GA address (step 3244).

Figure 3F:
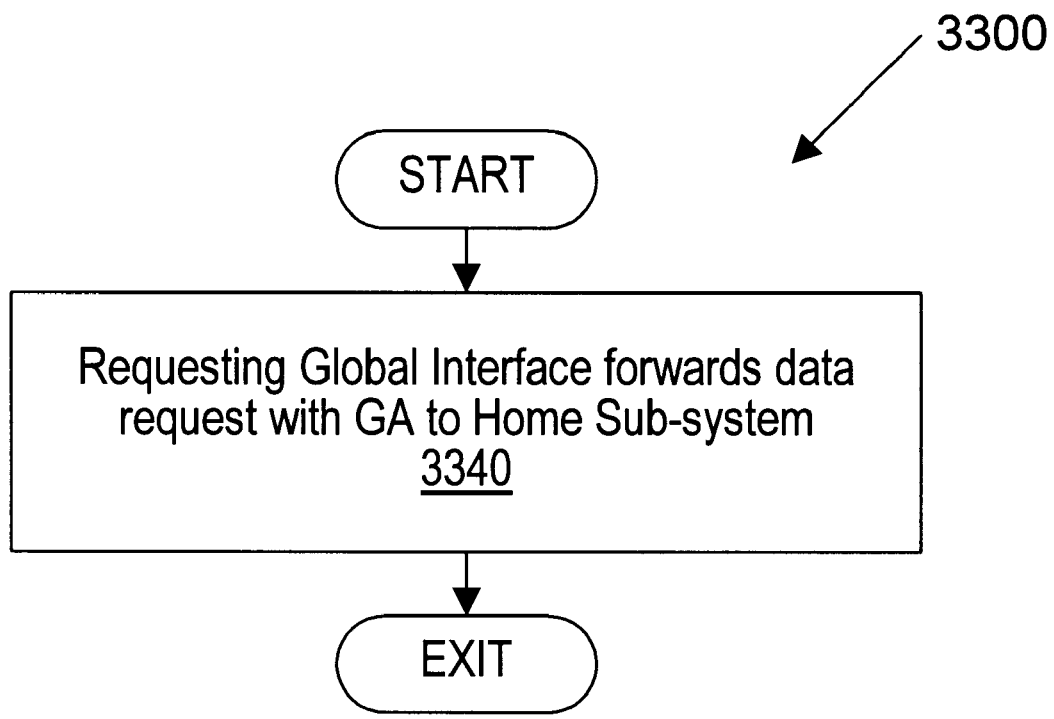

Alternatively, as shown in FIG. 3F, in the case of the NUMA mode access, no LPA2GA address translation is needed. Instead, the GA, i.e., the unmodified PA, is sent by global interface 315 to the home sub-system whose address space includes the data line of interest, e.g., sub-system 320, via global interconnect 390 (step 3340).

Returning to FIG. 3D, in both COMA and NUMA mode cases, where the data line is not found in requesting sub-system 310, home sub-system 320 updates home directory 326 to reflect the response to the read request, e.g., the new status of requesting sub-system 310 (step 3148). Next, home sub-system 320 checks directory 326 to determine if a valid copy of the data line exist in the home sub-system 320, i.e., to determine if the home sub-system is also the owner sub-system (step 3150).

If a valid copy exist in home sub-system 320, global interface 325 responds by retrieving the data line from cache memory 324 (if previously cached in COMA mode) or from one of 2L$s 323a, 323b, ... 323i (if previously cached in NUMA mode), and sending the requested data line to global interface 315 of requesting sub-system 310 via global interconnect 390 (step 3162).

Conversely, if home sub-system 320 does not have a valid copy of the data line, then the read request with the GA is forwarded to the address translator of the owner sub-system, e.g., translator 287 of owner sub-system 280 (step 3152). Upon receiving the GA from home sub-system 320, address translator 387 of sub-system 380 converts the GA into a LPA for global interface 385 (step 3154). Next, global interface 385 responds by retrieving the data line from either cache memory 384 (if previously cached in COMA mode) or one of 2L$ 383a, 383b . . . 383i (if previously cached in NUMA mode), and sending the requested data line to global interface 315 of requesting sub-system 310 via global interconnect 390 (step 3164).

Note that the data line of interest may be cached in either COMA or NUMA mode in one or more of sub-systems 310, 320 . . . 380, independently of each other. As such, the respective caching modes of the home sub-system and the owner sub-system is transparent to the requesting sub-system. For example, the data line may be cached in cache memory 324 (COMA mode) in home sub-system 320 and cached in 2L$ 383b (NUMA mode) in owner sub-system 380.

When the requesting global interface 315 receives the requested data line, global interface 315 forwards the data line to L2$ 313a which then provides the requested data line to requesting processor 311a. Note that a GA2LPA translation of requested data line need not be performed by MMU 312a (step 3180). The data line can be cached in L2$ 313a and/or COMA cache memory 314 off the critical path for subsequent retrieval by processor 311a thereby completing the read request (3190).

In sum, by providing the ability to dynamically cache in both COMA and NUMA modes, computer system 300 is able to efficiently cache small or sparse data structures in NUMA mode, computer system 300 avoids wasting large COMA pages, and to efficiently cache large data structures in COMA mode when the need arises. Generally, NUMA mode is more efficient if the data is not likely to be accessed again.

b) Definitions of classes of Caches misses

Thus, in order to better understand the underlying criteria for optimizing the selection between COMA and NUMA modes, it is useful to briefly define the general types of cache misses and the underlying causes for these misses as follows:

i) Compulsory cache misses or cold start cache misses occur the first time a data line of interest is accessed. These misses are unavoidable without resorting to techniques such as prefetching.

ii) Coherence cache misses resulting from the invalidation of a shared ("S") copy of the data line of interest. For example, when the S copy of a first sub-system is invalidated by a write request of a second sub-system. Subsequently, a read request for the data line by the first sub-system will result in a cache miss. The occurrence of these misses are independent of the size or depth of the cache, i.e., cannot be reduced by increasing the size of the cache.

iii) Capacity cache misses are the result of the data line being bumped (and written-back or discarded) when the cache is full to make room for a new data line. These misses can be reduced by increasing the overall size of the cache, but will still occur even if the cache is fully associative.

iv) Conflict cache misses occur when a data line cannot be cached because the set-associative cache is not deep enough, i.e., not enough "ways" in the structure of the cache. These misses can be reduced by increasing the number of ways, i.e., by increasing the associativity.

v) Combining miss : occurs when a first processor of a sub-system has a local copy of the data but is unable to share the data with a second processor of the same sub-system, causing the second processor to fetch the data from the owner sub-system.

Note that while types i and ii are unavoidable, types iii. iv, and v are avoidable depending on the implementation.

c) Exemplary Algorithms for selecting between NUMA and COMA caching modes

Having provided the hybrid COMA/NUMA cache architecture for supporting both COMA and NUMA cache accesses during the execution of software programs, exemplary methods for selecting between the COMA and NUMA caching modes for computer system 300 are described below.

In accordance with one selecting algorithm of the present invention, the default cache mode is the NUMA mode until the data access pattern of the software program provides an indication that caching in COMA mode is more efficient. This method of detection is based on the observation that in NUMA mode, capacity and conflict misses occur when data is discarded because the cache is either not associative enough or too small causing data to be discarded and unavailable when reaccessed at a later time.

Figure 4A:
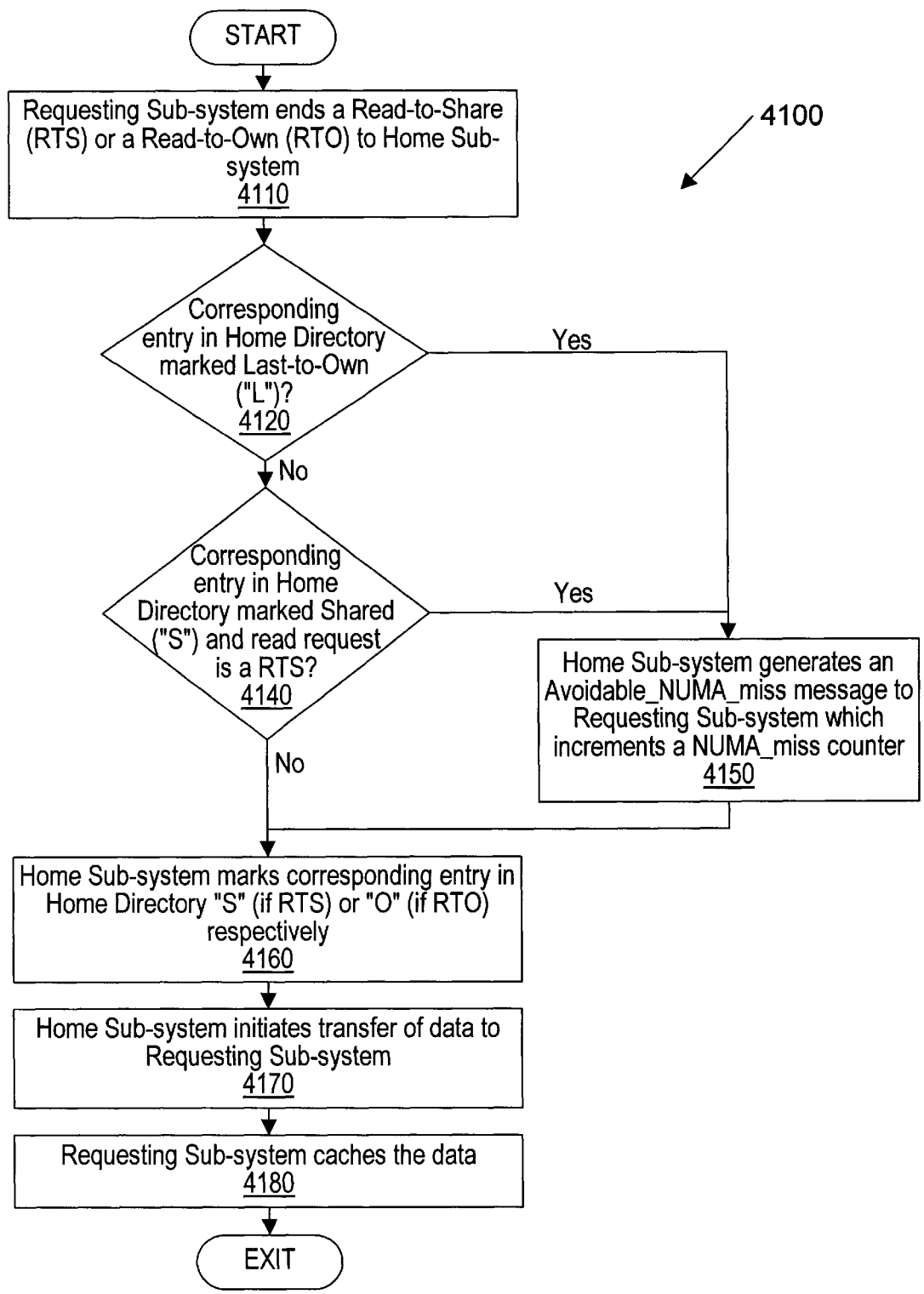
FIGS. 4A and 4B are flow diagrams illustrating one selection algorithm for the hybrid computer system wherein the default is the NUMA caching mode.
Figure 4B:
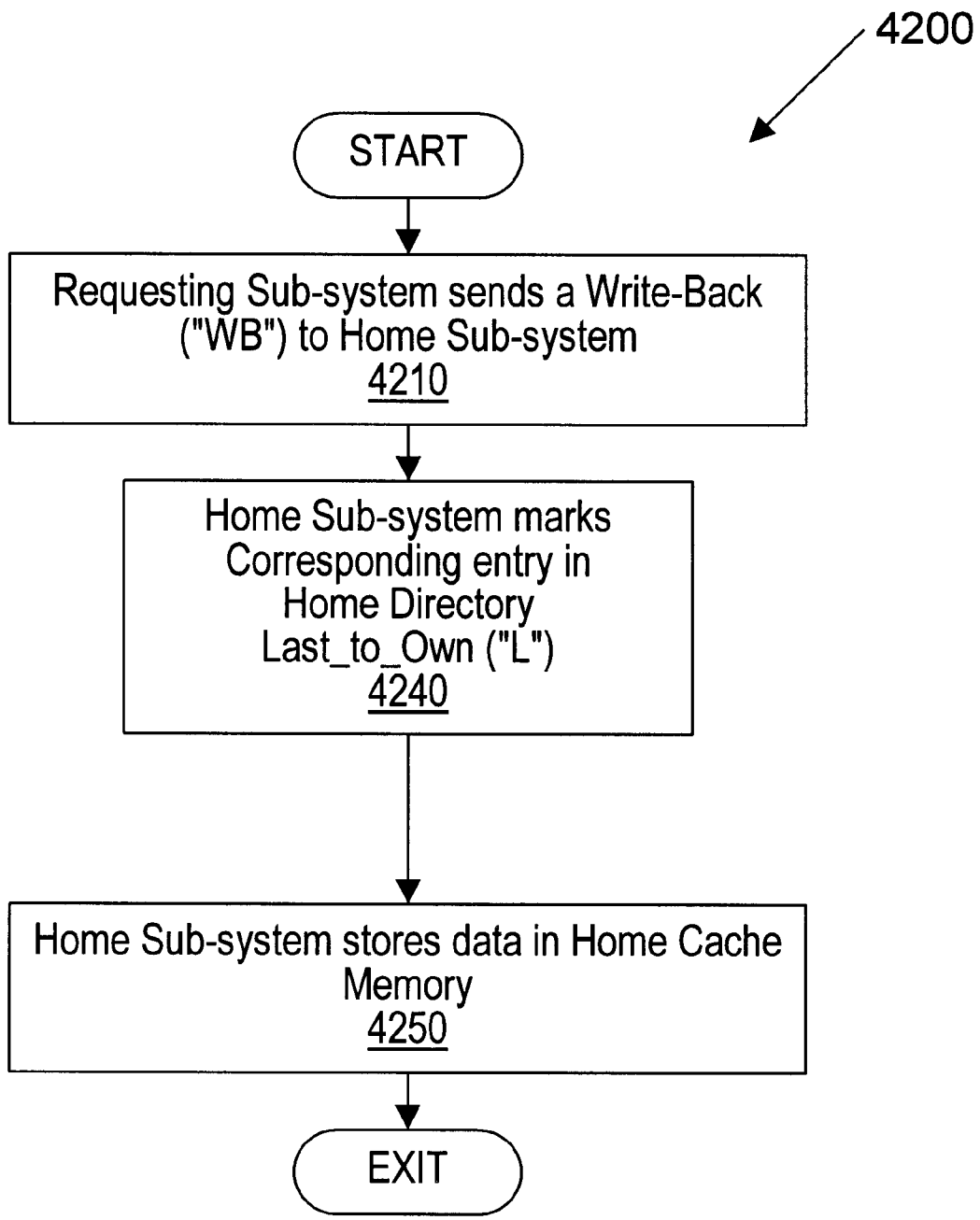

FIGS. 4A and 4B are flow diagrams illustrating an exemplary method for counting the number of conflict/capacity cache misses (avoidable NUMA mode misses) experienced by a requesting sub-system 310 with respect to a data line of a home sub-system 320. In this example, for each data line of home sub-system 320 there is a entry in home directory 326 corresponding to each sub-system of computer system 300.

First, consider avoidable NUMA mode misses resulting from an initial Read_To_Share (RTS) request followed by requesting sub-system 310 sending either another RTS request to home sub-system 320. Note that prior to sub-system 310's first access of a data line of home sub-system 320, the corresponding entry of home directory 326 is marked invalid ("I"), i.e., neither Last_To_Own ("L") nor shared ("S"). Accordingly, as shown in FIG. 4A, when requesting sub-system 310 sent the initial RTS request for the data line of home subsystem 320 (step 4110), the corresponding entry of home directory 326 is marked "S" (steps 4120, 4140, 4160). Home sub-system 320 then initiates a transfer of the requested data line to requesting sub-system 310 (step 4170). Upon receiving the requested data, requesting sub-system 310 stores the data in a cache line of 2L$ 313a for subsequent retrieval (step 4180).

Subsequently, since the cached data line has an "S" state resulting from the initial RTS request, when sub-system 310 needs to reuse the same cache line of 2L$ 313a, i.e., replace the cache line, sub-system 310 simply discards the content of the cache line by overwriting the same location, i.e., the cache line of 2L$ 313a. The data line is discarded from 2L$ 313a of sub-system 310 without informing home sub-system 320, i.e., the corresponding entry in home directory 326 remains in the "S" state.

Hence, referring again to the top of FIG. 4A, having discarded the data line, when requesting sub-system 310 needs to access the same data line of home sub-system 320, another RTS request is sent to sub-system 320 (step 4110). Since the corresponding directory entry is still marked "S" and the read request is a RTS request (steps 4120,4140), home sub-system 320 recognizes the event as a cache miss and generates an Avoidable_NUMA_miss message to requesting sub-system 310, causing requesting sub-system 310 to increment a hardware or software NUMA_miss counter (step 4150). Note that the Avoidable_NUMA_miss message is sent since conflict/capacity (non-avoidable) misses have occurred but are undetectable by this algorithm in COMA mode. Depending on the implementation, the Avoidable_NUMA_miss message can be piggy-backed on another message or sent as a separate message. Next, home sub-system 320 updates directory 326 by marking the cache line as "S" (step 4160). Home sub-system 320 also initiates the transfer of the requested data to requesting sub-system 310 (step 4170), which then stores the data in a cache line of 2L$ 313a for subsequent retrieval (step 4180).

Referring now to both FIGS. 4A and 4B, consider the avoidable NUMA mode misses resulting from a RTS or a Read_To_Own (RTO) request after requesting sub-system 310 was the last owner of a data line of home sub-system 320, i.e., after a RTO request followed by a Write_Back (WB) from sub-system 310 to home sub-system 320.

As discussed above, prior to sub-system 310's first usage of a data line of home sub-system 320, the corresponding entry of home directory 326 is neither "L" nor "S". Accordingly, as shown in FIG. 4A, when sub-system 310 sends an initial RTO request to subsystem 320 (step 4110), sub-system 320 responds by marking the corresponding entry "O" in directory 326 (steps 4120, 4140, 4160). Home sub-system 320 also initiates a transfer of the requested data to requesting subsystem 310 (step 4170). Sub-system 310 can now store the data line in a cache line of 2L$ 313a for subsequent retrieval (step 4180).

Referring now to FIG. 4B, when sub-system 310 needs to reuse, i.e., replace the cache line of 2L$ 313a, sub-system 310 sends a write-back ("WB") request to home sub-system 320 together with the modified data line from 2L$ 313a (step 4210). Home sub-system 320 responds by marking the corresponding entry in directory 326 as "L", indicating that sub-system 310 was the last owner of the data line before the cache line was replaced, i.e., bumped because of a conflict/capacity miss (step 4240). In this example, the "L" is implemented as a single bit in directory 326, indicating that the owner sub-system's information is old and that home sub-system 320 is now the new "owner" of the data line. Home sub-system 320 then write the data line back to home cache memory 324 (step 4250).

Referring back to FIG. 4A, subsequently, when sub-system 310 needs to access the same data line of home sub-system 320, a RTS_req or a RTO_req is sent to sub-system 320 (step 4110). Since the corresponding directory entry is marked as "L" (step 4120), home sub-system recognizes the event as an avoidable NUMA cache miss and generates an Avoidable_NUMA_miss message to requesting sub-system 310, causing requesting sub-system 310 to increment its NUMA_miss counter (step 4150). Next, home subsystem 320 updates directory 326 by marking the cache line as shared ("S") or as owned ("O"), respectively (step 4160). Home sub-system 320 also initiates the transfer of the requested data to requesting sub-system 310 (step 4170), which then stores the data in a cache line of 2L$ 313a for subsequent retrieval (step 4180).

Note that the two NUMA cache miss preconditions described above, corresponding to the "S " and "L" states, can be used independently or together as illustrated in the example above. Hence, separate S_miss and L_miss counters may be used.

In this implementation, a requesting sub-system has a set of n page counters. Each counter has a page address associated with it. A counter in state "idle" stores the page address of the first NUMA_miss in its page address portion. New NUMA_miss replies which match its page address will cause the respective counter to increment. The requesting sub-system can access, via software, the counter value and address value before resetting the counter state back to "idle".

Other variations are possible. For example, instead of dedicating a counter to a page, conflict counters are associated with multiple pages since associating a counter with each page of a GA address space may be prohibitively expensive. Alternatively, an associative management of a limited pool of counters can ensure that NUMA_misses to the most frequently missed pages (or set of pages) are tracked.

In yet another variation of this embodiment, each page's corresponding entry in the GA2LPA table has a small counter field, specifying which counter, if any, is associated with the accessed page. The value of the counter field can be initiated by software executing in processor 321a. Such an arrangement permits multiple pages to share the same counter so that, for example, a data structure spanning several pages can be tracked with the same counter.

By tracking the behavior of a specific data structure, processor 321a will be able to select the appropriate NUMA COMA strategy, thereby maximizing the benefit from the hybrid NUMA/COMA caching scheme of the present invention. Counters can also be used by the operating system executed by processor 321a to dynamically change the NUMA/COMA mode based on the current behavior of the data structure. Depending on the particular implementation, cache mode conversion thresholds can be selected statically or dynamically, either by the operating system or under hardware control, in response to parameters such as changing system load/behavior, memory utilization, and global message traffic density.

Hence, by attempting to differentiate between coherent/compulsory misses and capacity/conflict misses, it is possible to optimize the use of the hybrid COMA/NUMA cache system by entering the COMA page-oriented mode when the conflict counter exceeds a preset number.

Figure 5:
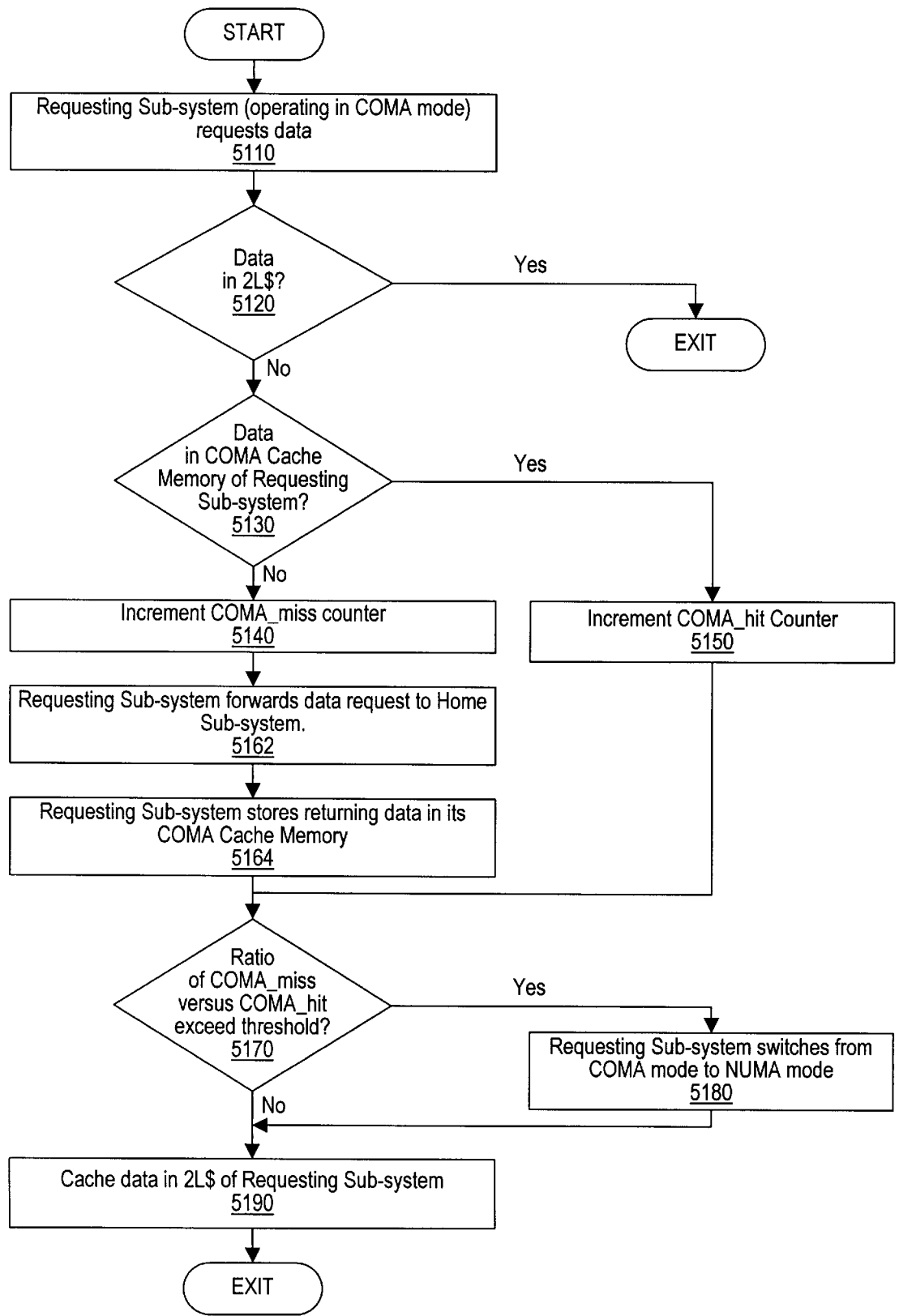
FIG. 5 is a flow diagram illustrating another selection algorithm for the hybrid computer system wherein the default is the COMA caching mode.

FIG. 5 is a flowchart illustrating another selection algorithm of the present invention, wherein the default mode for system 300 is the COMA mode. Subsequently, the NUMA mode is attempted under the following conditions. A pair of counters, a COMA miss counter and a COMA_hit counter, are provided for each COMA page. The respective COMA_miss counters and COMA_hit counters may be incorporated in, for example, directories 316, 326, . . . 386.

Using sub-system 310 as the exemplary requesting sub-system, first, while operating in the default COMA mode, requesting sub-system 310 makes a request for a data line (step 5110). If the data is found in 2L$ 313a, then the read request is completed (step 5120). Else if the data cannot be found in 2L$ 313a, then a requesting sub-system 310 determines if the data is stored in COMA cache memory 314 (step 5130).

If the data is found in COMA cache memory 314, the COMA_hit counter corresponding to the page associated with the data line is incremented (step 5150).

Else if the data is not found in COMA cache memory 314, the COMA_miss counter corresponding to the page associated with the data line is incremented (step 5140). Next, requesting sub-system 310 forwards the read request to the home sub-system 320 (step 5162). Upon the return of the requested data from the home sub-system or the owner sub-system (if the data is not owned by the home sub-system), the data is stored in COMA cache memory 314 of requesting sub-system 310 (step 5164). In this embodiment, if the corresponding page has not been previously allocated, a new page is allocated in COMA cache memory 314 and the data line is then written into the page allocated in COMA cache memory 314.

In one implementation, requesting sub-system 310 then compares the ratio of the COMA_miss counter against the COMA_hit counter to determine if the ratio exceeds a selectable threshold (step 5170). Depending on the particular implementation, cache mode conversion thresholds can be selected statically or dynamically, either by the operating system or under hardware control, in response to parameters such as changing system load/behavior, memory utilization, and global message traffic density.

If the ratio has not exceeded the threshold, then requesting sub-system 310 simply caches the data in 2L$ 313a and the read request is complete (step 5170). Conversely, the ratio exceeds the threshold, then requesting sub-system 310 switches from the default COMA-mode to the NUMA mode (step 1580), and caches the data line in 2L$ 313a of requesting sub-system 310 (step 1590).

In sum, for each page in COMA cache memory 314, 324, . . . 384, every time there is a COMA mode cache miss associated with the page, the corresponding COMA_miss counter is incremented. Conversely, for every cache hit in COMA cache memories 314, 324, . . . 384 associated with the page, the corresponding COMA_hit counter is incremented. Eventually, when the COMA_miss counter associated with the page exceeds the corresponding COMA_hit counter by a pre-determined threshold, the cache lines corresponding to the page of interest is cached in NUMA mode for subsequent accesses.

Variations of the above-described algorithms are possible. For example, instead of dedicating a counter to a page, conflict counters are associated with multiple pages since associating a counter with each page of an LPA address space may be prohibitively expensive. Alternatively, an associative management of a limited pool of counters can ensure that NUMA_misses to the most frequently missed pages (or set of pages) are tracked. It is also possible to associate each counter with one or more entries of an LPA2GA table.

Note that the above-described selection algorithms is also useful for optimizing COMA-only or NUMA-only cache architectures and also useful for diagnostic applications such as instrumenting software. Further, the two disclosed selection algorithms can be used independently or together. Other selection algorithms are also possible.

Modifications to the COMA/NUMA architecture and selection algorithms of the present invention are possible without departing from the spirit of the invention. These include static methods for selecting between COMA and NUMA modes. For example, kernel software can be executed in NUMA mode while application software can be executed in COMA mode or vice versa. Alternatively, both kernel and application software can be executed in COMA, i.e., "waste" pages of cache memory 314 until it is full before switching to the NUMA mode. Accordingly, the scope of the invention should only be limited by the claims.

What is claimed is:

1. A hybrid caching system useful in association with a computer system having a plurality of subsystems coupled to each other by a system interconnect, and wherein data is stored in said hybrid caching system as a plurality of pages, each page including a plurality of data lines, said hybrid caching system comprising:

a plurality of cache memories configured to store at least one of said plurality of pages, wherein a first of said plurality of said cache memories is associated with a first of said subsystems and a second of said plurality of cache memories is associated with a second of said subsystems, wherein said first subsystem is a home subsystem for a first of said plurality of pages and a second of said plurality of pages, and said second cache memory is configured to store said first page; and a plurality of hybrid caches configured to store a plurality of data lines, wherein a first of said plurality of hybrid caches is associated with said first subsystem and a second of said plurality of hybrid caches is associated with said second subsystem, wherein said second hybrid cache is configured to store a first data line of said first page stored in said second cache memory and a second data line stored in said first hybrid cache.

2. The hybrid caching system of claim 1 wherein data stored in said second cache memory is accessed by said second subsystem using a local physical address.

3. The hybrid caching system of claim 1 wherein data stored in said second hybrid cache is accessed by said second subsystem using a global address.

4. The hybrid caching system of claim 2 wherein said second subsystem further comprises an address translator for translating said local physical address into a global address.

5. A method of storing data in a computer system having a plurality of subsystems coupled to each other by a system interconnect, each said subsystem including a processor, a hybrid cache, a cache memory and a directory, said method comprising:

determining whether data should be stored in a hybrid cache of one subsystem; and determining whether the data should be stored in a cache memory of said one subsystem.

6. A method of storing data in a computer system having a plurality of subsystems coupled to each other by a system interconnect, each said subsystem including a processor, a hybrid cache, a cache memory and a directory, said method comprising:

storing data associated with a data line in a hybrid cache of one said subsystem; and if the computer system determines said data should be stored in a cache memory, then storing said data in a cache memory of said one subsystem.

7. The method of claim 6 wherein the step of storing said data in said cache memory of said one subsystem comprises:

allocating a page of memory space in said cache memory of said one subsystem; and storing said data within said allocated page of said cache memory of said one subsystem.

8. The method of claim 5 further comprising determining whether the data should remain stored in said cache memory of said one subsystem.

9. The method of claim 8 wherein said determining step comprises:

incrementing a hit counter each time data from a page cannot be found in the hybrid cache of a requesting subsystem of said subsystems but is found in a cache memory of the requesting subsystem;

incrementing a miss counter each time data from said page cannot be found in either the hybrid cache or the cache memory of said requesting subsystem; and comparing the content of the hit counter against the content of the miss counter to determine if the ratio of the hit counter exceeds the miss counter by a threshold.

10. A method of accessing data in a computer system having a plurality of subsystems coupled to each other by a system interconnect, each said subsystem including a processor, a hybrid cache, a cache memory and a directory, said method comprising:

determining whether data is stored in a hybrid cache of a requesting subsystem of said subsystems; and if said data is stored in said hybrid cache of said requesting subsystem, then:

retrieving said data from said hybrid cache;

else:
   determining if said data has been stored in a cache memory of said requesting subsystem.

11. The method of claim 10 wherein if it is determined that said data is not stored in either the hybrid cache or the cache memory of said requesting subsystem, then a read request is sent to a home system of said subsystems.

12. The method of claim 11 wherein if it is determined that said data is stored in said home subsystem, then retrieving said data from said home subsystem.

13. The method of claim 12 wherein if it is determined that said data is not stored in said home subsystem, then retrieving said data from an owner subsystem of said subsystems.

14. A method of accessing data in a computer system having a plurality of subsystems coupled to each other by a system interconnect, each subsystem including a processor, a hybrid cache, a cache memory and a directory, said method comprising:

determining if data has been stored in either a first mode or a second mode by a requesting subsystem of said subsystems by comparing an address of said data with a first range of memory addresses and a second range of memory addresses.

15. The method of claim 14 wherein said first range is a local physical address range associated with said requesting subsystem and said second range is a global address range.

16. The method of claim 15 wherein if said determining step determines the address of said data is a local physical address associated with said requesting subsystem, then the determining if the data stored in either the hybrid cache or the cache memory of the requesting subsystem.

17. The method of claim 16 wherein if said data cannot be found in either of the hybrid cache or the cache memory of said requesting subsystem, then the method further comprises:

translating the local physical address of said data associated with said requesting subsystem into a global address;

forwarding a read request with the global address to a home subsystem of said subsystems;

translating the global address into a local physical address of said home subsystems;

determining whether data was stored in either a hybrid cache or a cache memory of said home subsystems; and if said data was stored in said home subsystem, retrieving said data from said home subsystem.

18. The method of claim 17 wherein if said home subsystem determines that said data is not stored in said home subsystem, then the method further comprises:

forwarding the read request with the global address to an owner subsystem of said subsystem;

translating the global address into a local physical address of said owner subsystem;

determining whether data was stored in either a hybrid cache or a cache memory of said owner subsystem; and if said data was stored in said owner subsystem, retrieving said data from said owner subsystem.

19. A computer program product including a computer-usable medium having computer-readable code embodied therein configured to cause a computer system to select between a data line caching mode and a page caching mode, the computer system having a plurality of subsystems coupled to each other by a system interconnect, each subsystem including a processor, a hybrid cache, a cache memory and a directory, the computer-readable code comprising:

code instructions configured to cause one of said subsystems to determine whether data should be stored in a hybrid cache of said one subsystem; and code instructions configured to cause said one subsystem to determine whether the data should also be stored in a cache memory of said one subsystem.

20. A computer program product including a computer-usable medium having computer-readable code embodied therein configured to cause a computer system to select between a data line cache mode and a page cache mode, the computer system having a plurality of subsystems coupled to each other by a system interconnect, each said subsystem including a processor, a hybrid cache, a cache memory and a directory, the computer-readable code comprising:

code instructions configured to cause a requesting subsystem of said subsystems to determine whether data is stored in a hybrid cache of said requesting subsystem;

code instructions configured to cause said requesting subsystem to receive said data from said hybrid cache; and code instructions configured to cause said requesting subsystem to determine if said data has been stored in a page cache mode in a cache memory of said requesting subsystems.

\* \* \* \* \*